US009034989B2

(12) United States Patent
Padwa et al.

(10) Patent No.: US 9,034,989 B2
(45) Date of Patent: May 19, 2015

(54) BRANCHED PHA COMPOSITIONS, METHODS FOR THEIR PRODUCTION, AND USE IN APPLICATIONS

(75) Inventors: Allen R. Padwa, Worcester, MA (US); Yelena Kann, Marblehead, MA (US); Robert S. Whitehouse, Lexington, MA (US); Kevin Sheehan, North Grafton, MA (US)

(73) Assignee: Metabolix, Inc., Cambridge, MA (US)

( * ) Notice: Subject to any disclaimer, the term of this patent is extended or adjusted under 35 U.S.C. 154(b) by 1091 days.

(21) Appl. No.: 13/001,019

(22) PCT Filed: Jun. 19, 2009

(86) PCT No.: PCT/US2009/003675
§ 371 (c)(1),
(2), (4) Date: May 13, 2011

(87) PCT Pub. No.: WO2010/008445
PCT Pub. Date: Jan. 21, 2010

(65) Prior Publication Data
US 2011/0251349 A1    Oct. 13, 2011

Related U.S. Application Data

(60) Provisional application No. 61/133,026, filed on Jun. 25, 2008, provisional application No. 61/207,493, filed on Feb. 12, 2009, provisional application No. 61/133,023, filed on Jun. 25, 2008, provisional application No. 61/199,817, filed on Nov. 20, 2008, provisional application No. 61/200,619, filed on Dec. 2, 2008, provisional application No. 61/203,542, filed on Dec. 23, 2008, provisional application No. 61/166,950, filed on Apr. 6, 2009.

(51) Int. Cl.
*C08G 63/91*    (2006.01)
*C08F 299/04*    (2006.01)
*C08L 67/04*    (2006.01)
*B29C 51/02*    (2006.01)

(52) U.S. Cl.
CPC .......... *C08G 63/912* (2013.01); *Y10S 525/938* (2013.01)

(58) Field of Classification Search
USPC .......................................... 525/190, 450, 938
See application file for complete search history.

(56) References Cited

U.S. PATENT DOCUMENTS

| | | |
|---|---|---|
| 4,132,707 A | 1/1979 | Borman |
| 4,145,466 A | 3/1979 | Leslie et al. |
| 4,999,388 A | 3/1991 | Okamoto |
| 5,000,991 A | 3/1991 | Hayashi et al. |
| 5,110,844 A | 5/1992 | Hayashi et al. |
| 5,128,383 A | 7/1992 | Amano et al. |
| 5,134,028 A | 7/1992 | Hayashi et al. |
| 5,519,066 A * | 5/1996 | McConnell et al. .......... 521/138 |
| 6,096,810 A * | 8/2000 | Asrar et al. ................... 524/80 |
| 6,156,852 A | 12/2000 | Asrar et al. |
| 6,201,083 B1 | 3/2001 | Asrar et al. |
| 6,248,862 B1 | 6/2001 | Asrar et al. |
| 6,552,124 B2 | 4/2003 | Wang et al. |
| 6,579,934 B1 | 6/2003 | Wang et al. |
| 6,620,869 B2 | 9/2003 | Asrar et al. |
| 6,984,694 B2 | 1/2006 | Blasius, Jr. et al. |
| 7,208,535 B2 | 4/2007 | Asrar et al. |
| 8,003,731 B2 | 8/2011 | Seeliger et al. |
| 2002/0042481 A1 | 4/2002 | Marchessault et al. |
| 2005/0260723 A1 | 11/2005 | Yu |
| 2007/0027247 A1 | 2/2007 | Ueda |
| 2008/0281018 A1 | 11/2008 | Seeliger et al. |
| 2011/0293865 A1 | 12/2011 | Padwa et al. |

FOREIGN PATENT DOCUMENTS

| | | |
|---|---|---|
| CN | 101045810 | 10/2007 |
| EP | 1911809 | 4/2008 |
| WO | WO 99/14268 | 3/1999 |
| WO | WO 02/34857 | 5/2002 |
| WO | WO 2006/087346 | 8/2006 |
| WO | WO 2007/099056 | 9/2007 |
| WO | WO 2008/130225 | 10/2008 |
| WO | WO 2009/032864 | 3/2009 |
| WO | WO 2010/008445 A2 | 1/2010 |
| WO | WO 2010/008447 A2 | 1/2010 |
| WO | WO 2010/108076 A2 | 9/2010 |

OTHER PUBLICATIONS

International Preliminary Report on Patentability for PCT/US2009/003675. Date Mailed: Jan. 13, 2011.
Non-Final Office Action dated Jan. 22, 2013, U.S. Appl. No. 13/000,959.
Database WPI Week 200821, Thomson Scientific, London, GB; AN, 2008-c81447, XP002551289; & CN 101 045 810 A (Univ Shanghai Jiaotong), Oct. 3, 2007 Abstract.
Notification of Transmittal of the International Search Report and the Written Opinion of the International Searching Authority, or the Declaration, mailed on Feb. 11, 2009, for Application No. PCT/US2009/003687, consisting of 17 pages.
International Search report for PCT/US2009/003675 dated Jan. 20, 2010.
D'Haene et al., "Preparation and Characterization of a Branched Bacterial Polyester", Macromolecules, ACS 32(16): 5229-5235 (1999).
Database WPI Week 200382, Thomson Scientific, London, GB; AN, 2003-881164, XP002550636; & JP 2003 092926 A (Unitika Ltd), Apr. 2, 2003 Abstract.

\* cited by examiner

*Primary Examiner* — Fred M Teskin
(74) *Attorney, Agent, or Firm* — Hamilton, Brook, Smith & Reynolds, P.C.

(57) ABSTRACT

Branched PHA compositions, and related methods and articles are disclosed.

18 Claims, 5 Drawing Sheets

BRANCHED PHA COMPOSITIONS, METHODS FOR THEIR PRODUCTION, AND USE IN APPLICATIONS

RELATED APPLICATIONS

This application is the U.S. National Stage of International Application No. PCT/US2009/003675, filed Jun. 19, 2009, which designates the U.S., published in English, and claims the benefit of U.S. Provisional Application Nos. 61/133,026, filed on Jun. 25, 2008; 61/207,493, filed Feb. 12, 2009; 61/133,023, filed on Jun. 25, 2008; 61/199,817, filed on Nov. 20, 2008; 61/200,619 filed Dec. 2, 2008; 61/203,542 filed Dec. 23, 2008 and 61/166,950 filed Apr. 6, 2009.

The entire teachings of the above applications are incorporated herein by reference.

TECHNICAL FIELD

This invention relates to branched polyhydroxyalkanoate (PHA) compositions and methods of making branched PHA. The methods described herein produce more efficient branching, use less branching agent, and result in lower amounts of odiferous decomposition residues in the finished branched PHA polymer. The compositions of branched PHA are useful in applications such as thermoforming, particularly in thermoformed disposable products such as utensils, tubs, bowls, lids, cup lids, yogurt cups, containers, bottles and bottle-like containers, and other container-type items, foams, films, coatings and the like.

BACKGROUND

Biodegradable plastics are of increasing industrial interest as replacements or supplements for non-biodegradable plastics in a wide range of applications and in particular for packaging applications. One class of biodegradable polymers is the polyhydroxyalkanoates (PHAs), which are linear, aliphatic polyesters that can be produced by numerous microorganisms for use as intracellular storage material. Articles made from the polymers are generally recognized by soil microbes as a food source. There has therefore been a great deal of interest in the commercial development of these polymers, particularly for disposable consumer items. The polymers exhibit good biodegradability and useful physical properties.

Molecular weight, molecular weight distribution, and long chain branching are the dominating factors influencing processing and key physical properties of any polymeric composition.

PHA polymers have quite limited thermal stability, and undergo chain scission by beta-elimination mechanisms at general processing temperatures and conditions. This can reduce the molecular weight quite significantly which is undesirable for certain applications. Commercial utility of PHAs also can be limited in some applications, such as films, coatings and thermoforming, because of the low melt strength or melt elasticity often found in linear polymers. Thus, a need exists to address these shortcomings.

SUMMARY

Disclosed herein are methods of branching a starting polyhydroxyalkanoate polymer (PHA), by reacting the starting PHA with a branching agent and a cross-linking agent. In certain embodiments, the reacting with a branching agent is done in the presence of a co-agent (also referred to herein, as a "cross-linking agent), thereby forming a branched PHA. When the cross-linking agent is an epoxy functional compound, the branching agent is optionally ommitted from the reaction. The conditions of the reaction are suitable for reacting the branching agent and/or cross-linking agent with the starting PHA. A "branched" PHA is a PHA with a branching of the polymer chain or cross-linking of two or more polymer chains.

Also disclosed are compositions of branched polyhydroxyalkanoate (PHA) polymers and articles formed by these compositions. In one aspect a branched polyhydroxyalkanoate polymer comprises a plurality of PHA chains connected through a cross-linking agent. As used herein, "plurality of PHA chains" refers to when the starting PHA polymer has been reacted with a branching agent in the presence of or prior to reaction with a cross-linking agent. The resultant branched PHA molecule comprises numerous branched portions or chains of the starting polymer that are connected.

The crosslinking agent when reacted, for example, at its epoxide group(s) or double bond(s), becomes bonded to another molecule, e.g., a PHA or branched PHA. As a consequence the multiple molecules become cross-linked through the reactive group on the cross-linking agent. An "epoxy functional compound" is a cross-linking agent comprising two or more epoxy functional groups.

In certain embodiments, the functional group of the cross-linking agent is an epoxy-functional compound, for example, an epoxy-functional styrene-acrylic polymer, an epoxy-functional acrylic copolymer, an epoxy-functional polyolefin copolymer, oligomers comprising glycidyl groups with epoxy functional side chains, an epoxy-functional poly(ethylene-glycidyl methacrylate-co-methacrylate), or an epoxidized oil, poly(ethylene-co-methacrylate-coglycidyl methacrylate, ethylene-n-butyl acrylate-glycidyl methacrylate or combinations thereof.

In other embodiment, the cross-linking agent contains at least two reactive double bonds. These cross-linking agents include but is not limited to the following: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate, or combinations thereof.

In other embodiment, the co-agent is an anhydride functional group or alcohol group such as maleated polyproylene, maleated polyethylene or ethylene vinyl alcohol.

Also disclosed is a method of branching polyhydroxyalkanoate (PHA) polymers described below for use in the methods and compositions described herein. The term "branched PHA" refers to a PHA with branching of the chain and/or cross-linking of two or more chains. Branching on branched chains is also contemplated. Branching can be accomplished by various methods. In certain aspects of the invention, branching of the PHA is accomplished via a one step process. Alternatively a two-step process utilizing a step of thermolysing the PHA prior to branching is used. Both methods of branching the PHA are useful in the methods and compositions of the invention.

The article made by the methods or with the compositions described herein is, for example, a film, a blow molded article, thermoformed article, profile extruded article, a fiber or non-woven, a foam product, a coated paper product or a coated paperboard product. The product is a polymer sheet suitable for use in thermoforming articles. For example, the thermoformed article includes but is not limited to bottles, bottle-like containers, yogurt cups, bowls, lids or other containers and the like.

In a further aspect, a branched PHA is blended with one or more PHAs to increase the melt strength of the composition. The resultant branched PHA compositions are processed alone or in combination with linear PHAs or other materials by a range of polymer processing techniques including injection molding, cast film, cast sheet, thermoforming, blown film, blow molding, foam, fiber spinning or extrusion coating, forming pellets, onto a substrate to form articles. In the case of extrusion coating, preferred substrates are paper or paper board.

In any of the methods, articles, or branched PHAs disclosed herein, the resultant branched PHAs can include one or more of the following features.

The branched PHA can have a melt strength (G') of, for example, at least at least 2 to 20 times greater that the starting PHA when measured at 160° C. and 0.25 rad/sec. Additionally, the branched PHA can have a polydispersity index greater than the starting PHA.

The branched PHA can have a weight average molecular weight that is at least 1.2 times greater than the weight average molecular weight of the original (starting) PHA (herein designated as Mw/Mw,o). More preferably, Mw/Mw,o is at least 1.5 and most preferably at least 2.0. The practical upper limit of Mw/Mw,o is at the limit of polymer gel formation, which can act as imperfections in the PHA formulation. The upper limit of Mw/Mw,o depends on the starting Mw,o in that high molecular weight chains have a greater propensity to form gels. Thus, as Mw,o increases, the upper limit of Mw/Mw,o will be less. In most cases, the upper limit of Mw/Mw,o is 4.0, more preferably 3.5 and most preferably 3.0.

The invention also include a composition comprising a branched PHA (hereinafter a "branched PHA composition"). Such compositions can also optionally contain a linear polymer, e.g., a linear PHA. The linear PHA can have a melt strength of, for example, at most about 50 Pa or at most about 100 Pa at 0.25 rad/sec at 160° C. The term "linear PHA" refers to a PHA polymer in which the molecules are long chains without branches or cross-linking. This is the typical form of biologically synthesized PHA. Examples of a linear PHA include, but are not limited to, homopolymers such as poly 3-hydroxypropionate, poly 3-hydroxybutyrate, poly 4-hydroxybutyrate, and poly 5-hydroxypentanoate. Other useful examples of linear PHA include (but are not limited to) copolymers, and in particular copolymers of the D(R) isomer of 3-hydroxybutyrate copolymerized with one or more other 3, 4 or 5-hydroxyacid co-monomers.

The details of one or more embodiments of the invention are set forth in the description below. Other features, objects, and advantages of the invention will be apparent from the description and from the claims.

DETAILED DESCRIPTION

Figure 1:
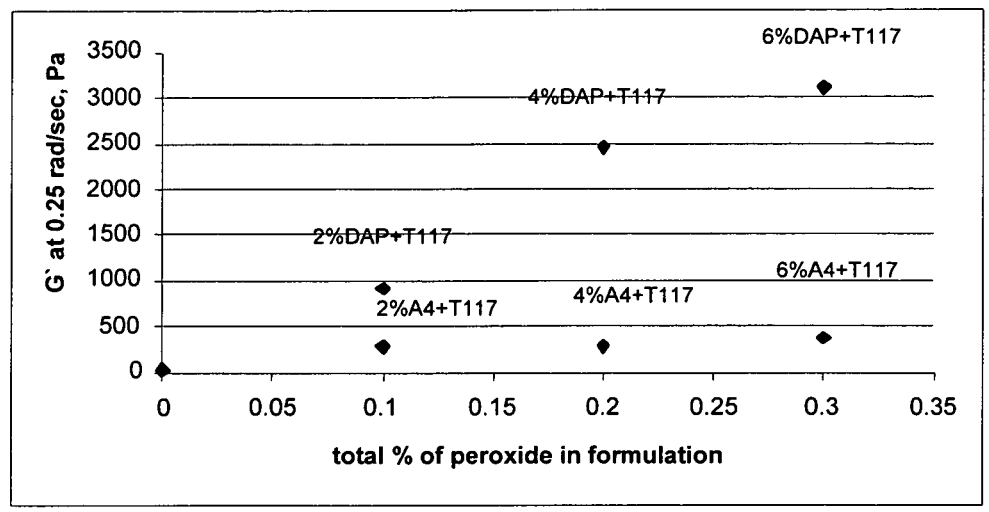
FIG. 1 is a scatter plot showing the change in G' (y-axis) as a function of the total peroxide Triganox 117 with and without the diallyl phthalate (x-axis).

The invention provides branched polymer compositions and methods of preparing branched polymers with improved mechanical and rheological properties. The use of cross-linking agents further improve the desired properties of the PHA over the starting PHA. In one aspect, the cross-linking agents comprise two or more reactive groups such as double bonds or epoxides. These cross-linking agents react with and become covalently bonded (connected) to the polymer. The connection of multiple chains through these crosslinking agents form a branched polymer. The branched polymer has increased melt strength over the melt strength of the starting polymer.

Increased melt strength is useful in that it allows the polymers to be formed under a broader temperature range when the polymer is processed. This property for broader processing temperatures for polymer applications, such as in the production of blown film (i.e., in preventing or reducing bubble collapse), or cast film extrusion, thermoformed articles (i.e., preventing or reducing sheet sag during thermoforming), profile extruded articles (i.e., preventing or reducing sag), and foam (i.e., preventing or reducing cell collapse and collapse of the overall foam), non-woven fibers, monofilament, etc. The polymer' stability at processing temperatures and can accordingly experience a drop in melt strength. This can cause difficulties in processing these polymers.

The methods and branched compositions of the invention improve the melt strength of PHAs, a desirable property for many polymer product applications. Melt strength is a rheological property that can be measured a number of ways. One measure is G'. G' is the polymer storage modulus measured at melt processing temperatures.

Physical properties and rheological properties of polymeric materials depend on the molecular weight and distribution of the polymer. "Molecular weight" is calculated in a number of different ways. Unless other wise indicated, "molecular weight" refers to weight average molecular weight.

"Number average molecular weight" ($M_n$) represents the arithmetic mean of the distribution, and is the sum of the products of the molecular weights of each fraction, multiplied by its mole fraction ($\Sigma N_i M_i/\Sigma N_i$).

"Weight average molecular weight" ($M_w$) is the sum of the products of the molecular weight of each fraction, multiplied by its weight fraction ($\Sigma N_i M_i^2/\Sigma N_i M_i$). $M_w$ is generally greater than or equal to $M_n$.

One way of increasing the melt strength is by branching the PHA polymer, and various methods for accomplishing this are described herein. Branching of PHA is as result of reacting with branching agents, for example, peroxides. Also, cross-linking agents, for example, reactive compounds (compounds with epoxy groups and compounds with reactive double bonds) that enhance or increase the branching of the polymer, can also be used. Addition of other reactive polymeric compounds, such as reactive acrylics, can also be employed to the rate of branching architecture of the PHA. All of these methods are described herein.

Cross-Linking Agents

Cross-linking agent, also referred to as co-agents, used in the methods and compositions of the invention are cross-linking agents comprising two or more reactive functional groups such as epoxides or double bonds. These cross-linking agents modify the properties of the polymer. These properties include, but are not limited to, melt strength or toughness.

One type of cross-linking agent is an "epoxy functional compound." As used herein, "epoxy functional compound" is meant to include compounds with two or more epoxide groups capable of increasing the melt strength of polyhydroxyalkanoate polymers by branching, e.g., end branching as described above. When an epoxy functional compound is used as the cross-linking agent in the disclosed methods, a branching agent is optional. As such one embodiment of the invention is a method of branching a starting polyhydroxyalkanoate polymer (PHA), comprising reacting a starting PHA with an epoxy functional compound. Alternatively, the invention is a method of branching a starting polyhydroxyalkanoate polymer, comprising reacting a starting PHA, a branching agent and an epoxy functional compound. Alternatively, the invention is a method of branching a starting polyhydroxyalkanoate polymer, comprising reacting a starting PHA, and an epoxy functional compound in the absence of a branching agent.

Such epoxy functional compounds can include epoxy-functional, styrene-acrylic polymers (such as, but not limited to, e.g., Joncryl ADR-4368 (BASF), or MP-40 (Kaneka)), acrylic and/or polyolefin copolymers and oligomers containing glycidyl groups incorporated as side chains (such as, but not limited to, e.g., LOTADER® (Arkema), poly(ethylene-glycidyl methacrylate-co-methacrylate)), and epoxidized oils (such as, but not limited to, e.g., epoxidized soybean, olive, linseed, palm, peanut, coconut, seaweed, cod liver oils, or mixtures thereof, e.g., Merginat® ESBO (Hobum, Hamburg, Germany) and Edenol® B 316 (Cognis, Dusseldorf, Germany)).

For example, reactive acrylics or functional acrylics cross-linking agents are used to increase the molecular weight of the polymer in the branched polymer compositions described herein. Such cross-linking agents are sold commercially. BASF, for instance, sells multiple compounds under the trade name "Joncryl", which are described in U.S. Pat. No. 6,984,694 to Blasius et al., "Oligomeric chain extenders for processing, post-processing and recycling of condensation polymers, synthesis, compositions and applications", incorporated herein by reference in its entirety. One such compound is Joncryl ADR-4368CS, which is styrene glycidyl methacrylate and is discussed below. Another is MP-40 (Kaneka). And still another is Petra line from Honeywell, see for example, U.S. Pat. No. 5,723,730. Such polymers are often used in plastic recycling (e.g., in recycling of polyethylene terephthalate) to increase the molecular weight (or to mimic the increase of molecular weight) of the polymer being recycled. Such polymers often have the general structure:

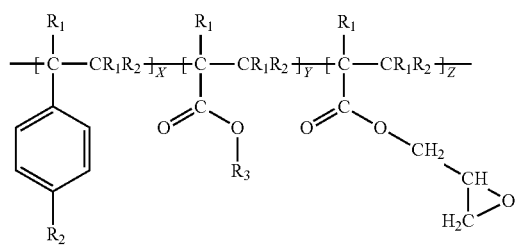

$R_1$ and $R_2$ are H or alkyl
$R_3$ is alkyl
x and y aer 1-20
z is 2-20

E.I. du Pont de Nemours & Company sells multiple reactive compounds under the trade name Elvaloy®, which are ethylene copolymers, such as acrylate copolymers, elastomeric terpolymers, and other copolymers. One such compound is Elvaloy PTW, which is a copolymer of ethylene-n-butyl acrylate and glycidyl methacrylate. Omnova sells similar compounds under the trade names "SX64053," "SX64055," and "SX64056." Other entities also supply such compounds commercially.

Specific polyfunctional polymeric compounds with reactive epoxy functional groups are the styrene-acrylic copolymers. These materials are based on oligomers with styrene and acrylate building blocks that have glycidyl groups incorporated as side chains. A high number of epoxy groups per oligomer chain are used, for example 5, greater than 10, or greater than 20. These polymeric materials generally have a molecular weight greater than 3000, specifically greater than 4000, and more specifically greater than 6000. These are commercially available from S.C. Johnson Polymer, LLC (now owned by BASF) under the trade name JONCRYL, ADR 4368 material. Other types of polyfunctional polymer materials with multiple epoxy groups are acrylic and/or polyolefin copolymers and oligomers containing glycidyl groups incorporated as side chains. A further example of such a polyfunctional carboxy-reactive material is a co- or ter-polymer including units of ethylene and glycidyl methacrylate (GMA), available under the trade name LOTADER® resin, sold by Arkema. These materials can further comprise methacrylate units that are not glycidyl. An example of this type is poly(ethylene-glycidyl methacrylate-co-methacrylate).

Fatty acid esters or naturally occurring oils containing epoxy groups (epoxidized) can also be used. Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g., Merginat® ESBO from Hobum, Hamburg, or Edenol® B 316 from Cognis, Dusseldorf), but others may also be used.

Another type of cross-linking agent are agents with two or more double bonds. Cross-linking agents with two or more double bond cross-link PHAs by after reacting at the double bonds. Examples of these include: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate.

An additional group of co-agent are anhydide co-agents such as: malenated polyproylene, malenated polyethylene or combinations thereof.

In general, it appears that compounds with terminal epoxides may perform better than those with epoxide groups located elsewhere on the molecule.

Compounds having a relatively high number of end groups are the most desirable. Molecular weight may also play a role in this regard, and compounds with higher numbers of end groups relative to their molecular weight (e.g., the Joncryls are in the 3000-4000 g/mol range) are likely to perform better than compounds with fewer end groups relative to their molecular weight (e.g., the Omnova products have molecular weights in the 100,000-800,000 g/mol range).

Polyhydroxyalkanoates (PHAs)

Polyhydroxyalkanoates are biological polyesters synthesized by a broad range of natural and genetically engineered bacteria as well as genetically engineered plant crops (Braunegg et al., (1998), *J. Biotechnology* 65: 127-161; Madison and Huisman, 1999, *Microbiology and Molecular Biology Reviews*, 63: 21-53; Poirier, 2002, Progress in Lipid Research 41: 131-155). These polymers are biodegradable thermoplastic materials, produced from renewable resources, with the potential for use in a broad range of industrial applications (Williams & Peoples, *CHEMTECH* 26:38-44 (1996)). Useful microbial strains for producing PHAs, include *Alcaligenes eutrophus* (renamed as *Ralstonia eutropha*), *Alcaligenes latus, Azotobacter, Aeromonas, Comamonas, Pseudomonads*, and genetically engineered organisms including genetically engineered microbes such as *Pseudomonas, Ralstonia* and *Escherichia coli*.

In general, a PHA is formed by enzymatic polymerization of one or more monomer units inside a living cell. Over 100 different types of monomers have been incorporated into the PHA polymers (Steinbüchel and Valentin, 1995, FEMS Microbiol. Lett. 128; 219-228. Examples of monomer units incorporated in PHAs include 2-hydroxybutyrate, lactic acid, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the starting PHA is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as PHB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting PHA is a copolymer (contain two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as PHB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV). By selecting the monomer types and controlling the ratios of the monomer units in a given PHA copolymer a wide range of material properties are achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The homopolymer (where all monomer units are identical) PHB and 3-hydroxybutyrate copolymers (PHB3HP, PHB4HB, PHB3HV, PHB4HV, PHB5HV, PHB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to −10° C., and a melting temperature $T_M$ of between 80° C. to 180° C. Type 2 PHB copolymers typically have a Tg of −20° C. to −50° C. and Tm of 55° C. to 90° C.

Preferred Type 1 PHB copolymers have two monomer units have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV; 13% 3HV; 14% 3HV; 15% 3HV;

PHB3HP is a Type 1 PHB copolymer where the 3HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP. 13% 3HP; 14% 3HP; 15% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4HV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4% 3HH; 5% 3HH; 6% 3HH; 7% 3HH; 8% 3HH; 9% 3HH; 10% 3HH; 11% 3HH; 12% 3HH; 13% 3HH; 14% 3HH; 15% 3HH;

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers have a 3HB content of between 80% and 5% by weight of the copolymer, for example 80%, 75%, 70%, 65%, 60%, 55%, 50%, 45%, 40%, 35%, 30%, 25%, 20%, 15%, 10%, 5% by weight of the copolymer.

PHB4HB is a Type 2 PHB copolymer where the 4HB content is in the range of 20% to 60% by weight of the copolymer and preferably in the range of 25% to 50% by weight of the copolymer for example: 25% 4HB; 30% 4HB; 35% 4HB; 40% 4HB; 45% 4HB; 50% 4HB by weight of the copolymer.

PHB5HV is a Type 2 PHB copolymer where the 5HV content is in the range of 20% to 60% by weight of the copolymer and preferably in the range of 25% to 50% by weight of the copolymer for example: 25% 5HV; 30% 5HV; 35% 5HV; 40% 5HV; 45% 5HV; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 45% 3HH; 50% 3HH; 55%; 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX 50% 3HX; 55% 3HX 60% 3HX; 65% 3HX 70% 3HX; 75% 3HX 80% 3HX; 85% 3HX 90% 3HX by weight of the copolymer.

PHAs for use in the methods, compositions and pellets described in this invention are selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend of PHB with a Type 1 PHB copolymer is a blend of PHB with PHB3HP where the PHB content in the PHA blend is in the range of 5% to 90% by weight of the PHA in the PHA blend and the 3HP content in the PHB3HP is in the range of 7% to 15% by weight of the PHB3HP.

The PHA blend of PHB with a Type 1 PHB copolymer is a blend of PHB with PHB3HV where the PHB content of the PHA blend is in the range of 5% to 90% by weight of the PHA in the PHA blend and the 3HV content in the PHB3HV is in the range of 4% to 22% by weight of the PHB3HV.

The PHA blend of PHB with a Type 1 PHB copolymer is a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer is a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer is a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer is a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer is a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend is a blend of a Type 1 PHB copolymer selected from the group PHB3HV, PHB3HP, PHB4HB, PHBV, PHV4HV, PHB5HV, PHB3HH and PHB3HX with a second Type 1 PHB copolymer which is different from the first Type 1 PHB copolymer and is selected from the group PHB3HV, PHB3HP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

The PHA blend of PHB with a Type 2 PHB copolymer is a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer is a blend of PHB with PHB5HV where the PHB content in the PHA blend is in the range of 30% to 95% by weight of the PHA in the PHA blend and the 5HV content in the PHB5HV is in the range of 20% to 60% by weight of the PHB5HV.

The PHA blend of PHB with a Type 2 PHB copolymer is a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer is a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX.

The PHA blend is a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend is a blend as disclosed in U.S. Pub. App. No. 2004/0220355, by Whitehouse, published Nov. 4, 2004, which is incorporated herein by reference in its entirety.

Microbial systems for producing the PHB copolymer PHBV are disclosed in U.S. Pat. No. 4,477,654 to Holmes. PCT WO 02/08428 and U.S. 2002/0164729, by Skraly and Sholl describes useful systems for producing the PHB copolymer PHB4HB, which is incorporated by reference in its entirety. Useful processes for producing the PHB copolymer PHB3HH have been described (Lee et al., 2000, *Biotechnology and Bioengineering*, 67: 240-244; Park et al., 2001, *Biomacromolecules*, 2: 248-254). Processes for producing the PHB copolymers PHB3HX have been described by Matsusaki et al., (*Biomacromolecules*, 2000, 1: 17-22).

In determining the molecular weight techniques such as gel permeation chromatography (GPC) is used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

In certain embodiments, the branched PHA has a linear equivalent weight average molecular weight of from about 150,000 Daltons to about 500,000 Daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs elution volume' calibration method.

Production of Branched PHA

The branching agents, also referred to a free radical initiator, for use in the compositions and method described herein include organic peroxides. Peroxides are reactive molecules, and can react with linear PHA molecules or previously branched PHA by removing a hydrogen atom from the polymer backbone, leaving behind a radical. PHA molecules having such radicals on their backbone are free to combine with each other, creating branched PHA molecules. When peroxides decompose at processing temperatures, they produce decomposition products and residues, many of which produce noxious odors in the finished polymer. Such odors are unappealing to consumers. In the production of other branched polymers, such as polypropylene, this is less of a problem because branched polypropylene is typically made at temperatures of 200° C. to above 250° C., and the by-products are more readily removed. Polyhydroxyalkanoates, however, are processed at much lower temperatures, and so the are not as efficiently removed, and remain in the polymer. It is therefore desirable to use as little peroxide as possible when producing branched PHAs.

Branching of PHA can be done by various methods. For example, methods for producing branched PHA are described in U.S. Pat. Nos. 6,096,810, 6,620,869, 7,208,535, 6,201,083, 6,156,852, and 6,248,862, all of which are incorporated herein by reference in their entirety.

Alternatively, a two-step method of branching PHA, as disclosed herein, can be used. It has been found that more efficient branching is induced in polyhydroxyalkanoate polymers by first thermolysing (i.e., heat treating) the PHA, and then subsequently treating it with a branching agent. This allows less peroxide to be used to achieve branching, thereby reducing the level of undesirable peroxide decomposition products.

During thermolysis, the linear polyhydroxyalkanoate polymer chains are cleaved resulting in unsaturated end groups. This thermolysed linear polymer, with its unsaturated end groups, is then treated with one or more peroxides. The peroxides remove hydrogen atoms from the polymer backbones, and the resulting radicals are free to react not only with another peroxide produced radical but also react with the chain ends of the PHA that were produced during thermolysis. The result is more efficient branching, because each peroxide-produced radical can more easily find a end of a linear chain than another peroxide-produced radical, and is more likely to do so before the peroxide decomposes.

For instance, the linear PHA polymer is thermolysed, and its molecular weight reduced by about half. A branching agent, e.g., a peroxide, can then be used to branch the polymer and bond multiple polymer molecules together. This is shown in the examples below.

In certain embodiments, the branched PHA is prepared as follows. First a linear PHA is thermolysed (heat treated) at elevated temperature to break the linear polymer chains. For example, a PHA (either linear or branched) is heated at an elevated temperature (e.g., from 170° C. to about 220° C., or from about 190° C. to about 220° C. for a sufficient period of time (e.g., from about 3.0 minutes to about 0.5 minutes) before it is mixed with a free radical initiator. Typically, this temperature is higher than the temperature used in the subsequent branching reaction. Without wishing to be bound by any theory, it is believed that certain PHA polymer chains are cleaved during the thermal treatment and terminal reactive groups are produced (during the subsequent branching reaction, these terminal reactive groups will facilitate the formation of branching by reacting with radical sites on other PHA molecules which are formed when the free radical initiator is added to the polymer). As a result of this chain cleavage, the thermally treated PHA has a lower weight average molecular weight than it did before heat treatment. In certain embodiments, the starting PHA is thermolysed to reduce its molecular weight between 25% and 75% before reacting with the branching agent. In yet other embodiments, the starting weight is reduced 50% or 40%. In yet other aspects, the starting PHA is thermolysed in the present of the cross-linking agents described herein.

Because the thermally treated PHA already contains terminal reactive groups when the branching initiator is added, this method is used to prepare PHAs with a high degree of branching.

The thermolysed PHA is then mixed with the requisite quantity of a free radical initiator by a suitable means. The mixing step can preferably be carried out under the conditions that the initiator does not undergo substantial decomposition. The branching reaction is then carried out by exposing the mixture to a temperature above the melting temperature of the PHA and the decomposition temperature of the initiator for a sufficient period of time. Without wishing to be bound by any theory, it is believed that decomposition of the initiator forms free radicals, which react with PHA molecules to generate radical sites on the polymer backbone. A branched PHA can then be formed by a coupling reaction between these radical sites on PHA molecules with other such radical sites, or the reactive unsaturated groups at the ends of the linear molecules that were created during the thermolysis step.

Typically, the reaction time is sufficient for branching between polymer molecules while substantially all of the initiator has decomposed. For example, the reaction time should be at least three times the half-life of the branching agent at the reaction temperature. The branched PHA thus prepared contains a minimal amount of residual initiator and possesses improved stability, reproducibility and rheological properties. Typically, the branched PHA has a higher degree of branching and weight average molecular weight than the initial PHA. For example, the branched PHA can have a weight average molecular weight of least about 1.2 times as high as that of the linear PHA.

Both the thermolysis step and the branching reaction are performed in two separate steps, for instance, the PHA is thermolysed and extruded, and then combined with the branching agent in a separate run.

Alternatively, both steps are performed in a single extruder in different subsequent zones. For instance, the thermolysing step is done in an extruder, and when the PHA is sufficiently thermolysed, the branching agent may be added to conduct the branching step. That is, the thermolysing step and the branching step is separate in time.

Both steps can also be performed in separate steps in separate zones in the extruder. For instance, the thermolysis step is performed in one zone of an extruder, and the branching agent can then be added as the thermolysed PHA enters another zone of the extruder.

Branching Agents

Branching agents, also referred to as, free radical initiators, are selected from any suitable initiator known in the art, such as peroxides, azo-dervatives (e.g., azo-nitriles), peresters, and peroxycarbonates. Suitable peroxides for use in the present invention include, but are not limited to, organic peroxides, for example dialkyl organic peroxides such as 2,5-dimethyl-2,5-di(t-butylperoxy) hexane, 2,5-bis(t-butylperoxy)-2,5-dimethylhexane (available from Akzo Nobel as TRIGANOX 101), tert-butylperoxy-2-ethylhexylcarbonate (available from Akzo Nobel as TRIGANOX 117), tert-amylperoxy-2-ethylhexylcarbonate (available from Akzo Nobel as TRIGANOX 131), n-butyl-4,4-di-(tert-butylperoxy)valerate (available from Akzo Nobel as TRIGANOX 17), 2,5-dimethyl-di(t-butylperoxy)hexyne-3, di-t-butyl peroxide, dicumyl peroxide (DCP, DiCuP), benzoyl peroxide, di-t-amyl peroxide, t-amylperoxy-2-ethylhexylcarbonate (TAEC), t-butyl cumyl peroxide, n-butyl-4,4-bis(t-butylperoxy)valerate, 1,1-di(t-butylperoxy)-3,3,5-trimethyl-cyclohexane, 1,1-bis(t-butylperoxy)-3,3,5-trimethylcyclohexane (CPK), 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)butyrate, t-butylperoxy-acetate, t-amylperoxyacetate, t-butylperoxybenzoate (TBPB), t-amylperoxybenzoate, di-t-butyldiperoxyphthalate, and the like. Combinations and mixtures of peroxides can also be used. Examples of free radical initiators include those mentioned herein, as well as those described in, e.g., *Polymer Handbook,* 3$^{rd}$ Ed., J. Brandrup & E. H. Immergut, John Wiley and Sons, 1989, Ch. 2. Irradiation (e.g., e-beam or gamma irradiation) can also be used to generate PHA branching.

The efficiency of branching and crosslinking of the polymer(s) can also be significantly enhanced by the dispersion of organic peroxides in a cross-linking agent, such as a polymerizable (i.e., reactive) plasticizers. The polymerizable plasticizer should contain a reactive functionality, such as a reactive unsaturated double bond, which increases the overall branching and crosslinking efficiency.

As discussed above, when peroxides decompose, they form very high energy radicals that can extract a hydrogen atom from the polymer backbone. These radicals have short half-lives, thereby limiting the population of branched molecules that is produced during the active time period. Reactive cross-linking agents are compounds that contain at least two unsaturated C—C double bond, preferably of a reactive nature (e.g., acrylates, methacrylates, allyls, methallyls, vinyl, etc.) and are reactive in free radical processes. The cross-linking agents can react very quickly, and produces a radical that is more stable and has a longer lifetime, so that they have a longer period of time in which to couple with the polymer backbone. This allows the use of less peroxide to induce the same amount of branching as is achieved with peroxide alone.

Additives

In certain embodiments, various additives is added to the branched PHA described above. Examples of these additives include antioxidants, pigments, UV stabilizers, fillers, plasticizers, nucleating agents, and radical scavengers.

Exemplary additives include, e.g., plasticizers (e.g., to increase flexibility of a thermoplastic composition), antioxidants (e.g., to protect the thermoplastic composition from degradation by ozone or oxygen), ultraviolet stabilizers (e.g., to protect against weathering), lubricants (e.g., to reduce friction), pigments (e.g., to add color to the thermoplastic composition), flame retardants, fillers, reinforcing, mold release, and antistatic agents. It is well within the skilled practitioner's abilities to determine whether an additive should be included in a thermoplastic composition and, if so, what additive and the amount that should be added to the composition.

In poly-3-hydroxybutyrate compositions, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall composition.

In other embodiments, the composition includes one or more plasticizers. The plasticizers may be used either alone respectively or in combinations with each other.

In certain embodiments, the compositions and methods of the invention can optionally include one or more surfactants. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Non-ionic surfactants with HLB values ranging from about 2 to about 16 can be used, examples being TWEEN-20, TWEEN-65, Span-40 and Span 85.

One or more lubricants can also be added to the compositions and methods of the invention. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants is warmed and melted before or during processing of the blend.

Nucleating Agents

For instance, an optional nucleating agent is added to the branched PHA to aid in its crystallization. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis(4-tert-butylphenyl) phosphate, and methylene bis-(2,4-tert-butylphenyl)phosphate; sorbitol derivatives such as bis(p-methylbenzylidene)sorbitol and bis(p-ethylbenzylidene) sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

In certain embodiments, the nucleating agent is selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, where the nucleating agent is dispersed in a liquid carrier, the liquid carrier is a plasticizer, e.g., a citric compound or an adipic compound, e.g., acetylcitrate tributyrate (Citroflex A4, Vertellus, Inc., High Point, N.C.), or DBEEA (dibutoxyethoxyethyl adipate), a surfactant, e.g., Triton X-100, TWEEN-20, TWEEN-65, Span-40 or Span 85, a lubricant, a volatile liquid, e.g., chloroform, heptane, or pentane, a organic liquid or water.

In other embodiments, the nucleating agent is aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole.

In particular embodiments, the nucleating agent can include aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole. The nucleant can have a chemical formula selected from the group consisting of

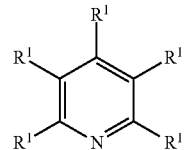

Formula 1

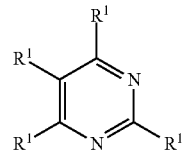

Formula 2

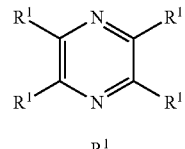

Formula 3

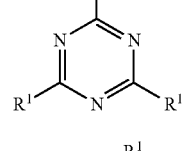

Formula 4

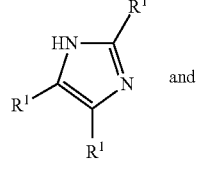

Formula 5 and

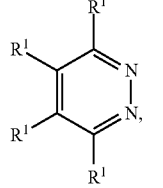

Formula 6 and combinations thereof, wherein each R1 is independently H, $NR^2R^2$, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

Another nucleating agent for use in the compositions and methods described herein are milled as described in PCT/US2009/041023, filed Apr. 17, 2009, which is incorporated by reference in its entirety. Briefly, the nucleating agent is milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent is milled in liquid carrier until at least 10% of the cumulative solid volume, at least 20% of the cumulative solid volume, at least 30% or at least 40%-50% of the nucleating agent can exist as particles with a particle size of 5 microns or less, 2 microns or less or 1 micron or less. In alternative embodiments, the nucleating agents is milled by other methods, such as jet milling and the like. Additionally, other methods is utilized that reduce the particle size.

The cumulative solid volume of particles is the combined volume of the particles in dry form in the absence of any other substance. The cumulative solid volume of the particles is determined by determining the volume of the particles before dispersing them in a polymer or liquid carrier by, for example, pouring them dry into a graduated cylinder or other suitable device for measuring volume. Alternatively, cumulative solid volume is determined by light scattering.

Annealing

Branched PHA compositions described herein and produced by the methods described herein can be processed into films of varying thickness, for example, films of uniform thickness ranging from 10-200 microns, for example, 20-75 microns, 75 to 150 microns, or from 50-100 microns.

Post-fabrication heat treating (e.g., annealing) of branched polyhydroxyalkanoate film produced by the methods and compositions described herein produces a film with increases in puncture and tear resistance. Such increases are not seen in other polymeric films, e.g., polyethylene. Such annealing is used to increase the toughness of injection moldings.

For instance, these branched PHA films are treated for about 10 to about 120 minutes at temperatures of about 80° C. to about 120° C. Such treatment improves the puncture resistance of the films up to 16-fold, while tear resistance could be improved by up to 35-fold (transverse direction) and up to 65-fold (machine direction).

Although various PHAs are capable of being processed on conventional processing equipment, many problems have been found with the polymers that impede their commercial acceptance. These include brittleness and age-related brittleness. For instance the mechanical properties of articles made from polyhydroxyalkanoate polymers are known to change over time, during storage at ambient conditions. Specifically, the impact toughness and tensile elongation at break ($\epsilon_b$) are known to decrease systematically over time. The exact reasons for this decrease are not known. This age-related increase in brittleness limits the commercial applications available for use of the polymer. In addition, the crystallization kinetics of the polymer are poorly understood, and longer cycle times (relative to polyethylene and polypropylene) are often required during processing of these polymers, further limiting their commercial acceptance. Post-fabrication heat treating (e.g., annealing) provides benefits to the mechanical properties of the branched PHAs.

These mechanical properties include strength and tear resistance. For instance, it was found that the puncture resistance of the films could be improved up to 16-fold, while tear resistance could be improved by up to 35-fold (transverse direction) and up to 65-fold (machine direction).

The methods and compositions disclosed herein can be annealed into polymer film, where the polymer is one or more branched polyhydroxyalkanoate polymers, and the film has a dart impact strength of at least about 30 g/mil, as measured by ASTM D1709.

As disclosed herein, "annealing" and "heat treatment" means a treatment where branched polyhydroxyalkanoate polymer processed to a product in nonliquid form is subsequently (i.e., after the film is formed) heated for a period of time. This has been found to provide surprising and unexpected properties of puncture toughness and tear resistance in PHA films. Preferably the flat film is heated to about 80° C. to about 140° C. for about 5 seconds to about 90 minutes, more preferably to about 90° C. to about 130° C. for about 10 minutes to about 70 minutes, and most preferably to about 110° C. to about 125° C. for about 15 minutes to about 60 minutes.

As used herein, "annealing" and "heat treatment" means a treatment where branched polyhydroxyalkanoate polymer processed to a product in nonliquid form is subsequently (i.e., after the product is formed) heated for a period of time. This has been found to provide surprising and unexpected properties of puncture toughness and tear resistance in PHA films. Increased toughness is also seen in injection moldings.

Preferably the flat branched PHA film is heated to about 80° C. to about 140° C. for about 5 seconds to about 90 minutes, more preferably to about 90° C. to about 130° C. for about 10 minutes to about 70 minutes, and most preferably to about 110° C. to about 125° C. for about 15 minutes to about 60 minutes.

For instance, flat branched polyhydroxyalkanoate film is annealed at 120° C. for 10 seconds. This is accomplished, for instance, in-line by forming the film in any of a variety of ways, and then running the film through an oven that is maintained at the appropriate temperature. The oven is long enough so that between entering and exiting the oven, the film is exposed to the heat for the appropriate amount of time. Alternatively, the film is "snaked" through the oven, e.g., back and forth on a series of rollers within the oven, so that the film is exposed to the heat for the appropriate amount of time before exiting the oven.

In practice, the actual time of the overall treatment may be longer. For branched polyhydroxyalkanoate film that has collected on standard rolls prior to treatment, for instance, the film at the interior of the roll will not be immediately exposed to the temperature needed to cause annealing, and the film at the interior of the roll will not exhibit the beneficial properties disclosed herein. The entire roll must therefore be maintained at the necessary temperature for a time sufficient for the polymer at the interior of the roll to experience the annealing temperatures. Alternatively, the film could be exposed to the appropriate temperatures after being made, but before being wound onto a roll. In such a situation, the film need only be exposed to the annealing temperature for the time necessary for the area being treated to come up to the appropriate temperature.

The film is exposed to temperatures very close to the melting point of the polymer(s) making up the film. In practice, however, this is best done with flat film, as a large roll of film could begin to stick to itself.

Similar methods is used for annealing injection moldings.

It has been found that heat treating branched polyhydroxyalkanoate film imparts surprising properties to the treated film. For instance, it was found that heat treatment of about 120° C. for 60 minutes improved the puncture resistance of the films (as measured by dart impact strength) by 3-fold for standard PHA films, while machine direction tear resistance (MD tear) could also be improved by 3-fold, and transverse direction tear resistance (TD tear) could be improved by 4- to 5-fold.

The improvements were especially marked with films made from branched PHA polymer. When films made from branched PHA polymer were subjected to the heat treatment as described herein, the dart impact strength increased by 16-fold, and MD tear and TD tear increased 65-fold and 22-fold, respectively.

It has been found that annealing, i.e., heat treating, PHA films greatly improves their performance. For instance, treating (unbranched) PHA films for about one hour at 120° C. is sufficient to impart the surprising strength improvements as shown in the examples below, and marked improvements is seen at 30 minutes of treatment. Strength improvements is seen with treatments of 80° C. for 10 minutes. Lower temperatures and/or shorter treatment times may also be used, depending on the film strength required for a given application.

Without wishing to be limited by theory, it may be that when polyhydroxyalkanoate film is made, the crystallization is not fully complete, and continues for some time thereafter. Late crystallization may cause internal shrinkage stresses, i.e., a form of "necking in" at the molecular level. If so, then such stresses may reduce the puncture toughness and tear resistance of the film. The heat treatment as described herein may relieve some of these internal stresses.

For instance, if a 100 gram dart is dropped onto a piece of film not treated according to the methods described herein, and such a piece of film already contains the equivalent of 50 grams of internal stresses, then the film is actually experiencing 150 grams of stress when the dart is dropped onto it. In contrast, an equivalent piece of film treated according to the methods described herein may have had its internal stresses removed by the treatment, and would only experience the stresses delivered by the dart.

The improvement in properties of the treated polyhydroxyalkanoate film is quite surprising, and is not seen in other commonly-available polymers. In the United States, HMW-HDPE (high molecular weight, high density polyethylene), LLDPE (linear low-density polyethylene) and LDPE (low density polyethylene) are the three leading material candidates for consumer bags and packaging. In selecting between these choices, merchants generally balance the need for weight strength vs. the need for puncture resistance. HMW-HDPE is currently the leading plastic bag for use in grocery stores in the U.S., because of its strength and ability to carry fairly heavy loads. HMW-HDPE films/bags have reasonable puncture toughness but very poor tear resistance. LLDPE films/bags are lower in stiffness and hence, load-bearing capacity, but they offer very high tear resistance and puncture toughness. LDPE bags and films have low stiffness, low puncture toughness and moderate tear resistance. However, LDPE helps processing of both LLDPE and HMW-HDPE and consequently it is often used as a blend component in HMW-HDPE and LLDPE films/bags. Provided below are the approximate properties of films from the above-mentioned polyethylenes.

| Polymer | MD Tear (g/mil) | TD Tear (g/mil) | Dart Impact (g/mil) | Tensile Modulus (MPa) |
|---|---|---|---|---|
| HMW-HDPE | ~10 | ~60-100 | ~300 | ~900 |
| LLDPE (Ziegler-Natta) | ~350 | ~500 | ~125 | ~150-200 |
| LLDPE (metallocene) | ~250 | ~300 | ~1000 | ~150-200 |
| LDPE | ~100 | ~100 | ~75 | ~100-250 |

When branched polyhydroxyalkanoate films are extruded or blown, they initially have a puncture toughness and tear resistance similar to that of HDPE. Surprisingly, however, when such films are heat treated according to the methods described herein, they take on a puncture toughness and tear resistance more similar to that of LDPE. This is surprising and unexpected, especially as HDPE and LDPE are two different polymers, and neither is "transmuted" into the other by any kind of heat treatment. In general, when polyethylene film is heat-treated as described herein, its impact strength is reduced. This was tested and is shown in the Examples below ("Effect of Annealing on Polyethylene (PE) Film").

When branched polyhydroxyalkanoate films are annealed post-fabrication, their performance improves considerably such that they are now on par with or considerably better than the best polyethylene (PE) films currently in the market. In contrast, all types of PE film display only a marginal (at best) change in performance with post-fabrication annealing. Annealing is therefore capable of producing a polyhydroxyalkanoate film with characteristics in the range of industry-leading LLDPE films.

The complex viscosity of PHA film polymers matches up very well with that of metallocene-LLDPE at low frequencies, and this translates to similar melt strength for the two polymers. In fact, PHA copolymers are converted into blown film on commercial lines equipped with dual-lip air rings and designed to operate using the low-stalk bubble configuration. Another important consideration is the longer melt relaxation time for PHA copolymers relative to the metallocene-based LLDPE even though their zero-shear viscosities are similar. This means that the relative contribution made by the elastic component to the linear viscoelastic measurements is greater for PHA copolymers. Likewise, the power-law index is much smaller for PHA copolymers. These differences is at least partially attributable to the temperature at which the melt rheological measurements (and the temperatures at which they are processed) are made relative to their respective melting points. Finally, the flow-activation energy for PHA copolymers is also considerably higher than that of linear polyethylene; $E_a$ is about 27 kJ/mol for linear polyethylene, while it is about 45-47 kJ/mol for PHA copolymers.

Sharkskin melt fracture is a melt rheological instability that is a significant concern in LLDPE blown film processing as it limits production rate. Often, process aids such as fluoroelastomers are added to LLDPE to delay the onset of sharkskin melt fracture to higher rates. This critical stress at which sharkskin melt fracture becomes evident is very similar to the critical stress for sharkskin melt fracture in polyethylene (D. S. Kalika and M. M. Denn, Journal of Rheology, 31, 815 (1987)). In PHA copolymer blown film processing, the higher flow activation energy (compared to polyethylene) coupled with modest molecular weight breakdown at higher temperatures makes it considerably easier to mitigate this rheological instability (when evident) with a small increase in die tip temperature.

PHA copolymer blown films are ideally suited for agricultural mulch, compost bags and other packaging applications. Compared with LLDPE and paper (two of the prominent incumbent materials used commercially in these applications), the tensile modulus of PHA copolymers is higher than that of LLDPE, and PHA copolymers are more compliant compared to paper. The tensile strength of PHA copolymer film is similar to that of LLDPE films and is considerably superior to that of paper. The tensile extensibility, or elongation to break, of PHA copolymer films is similar to that of LLDPE and considerably superior to that of paper. The puncture toughness and resistance to tear propagation are slightly lower than those of LLDPE films but are considerably superior to those of paper.

Post-fabrication annealing treatment results in a tremendous improvement in puncture toughness and tear resistance. Such performance improvements are not evident when LLDPE films are annealed. This unexpected performance improvement is best explained by considering the crystallization kinetics of the polymer. PHA copolymers are generally known to crystallize slowly compared to polyethylene and polypropylene. Crystallization depends on cooling rate for PHA copolymers, moreso than for HDPE and LLDPE, suggesting that the crystallization process may not be complete during the fabrication of PHA copolymer blown film. The additional crystallization and associated structural reorganizations that occurs after the film is collected on the rolls leads to the build-up of residual stresses that increases the constraint on the amorphous portions of the semi-crystalline structure. Post-fabrication annealing at elevated temperatures causes a portion of the residual stresses to relax and this improves the mechanical performance of the film considerably. This annealing treatment was also shown to lessen the constraint imposed on the mobility of the non-crystalline chain segments.

Application of Branched PHA

For the fabrication of useful articles, the branched PHA is processed at a tyically near the crystalline point of the branched PHA to minimize molecular weight loss. Additives are choses to be stable at these temperatures. While melted, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming.

The branched PHA compositions is used to create, without limitation, a wide variety of useful products, e.g., automotive, consumer durable, construction, electrical, medical, and packaging products. For instance, the polymeric compositions is used to make, without limitation, films (e.g., packaging films, agricultural film, mulch film, erosion control, hay bale wrap, slit film, food wrap, pallet wrap, protective automobile and appliance wrap, etc.), golf tees, caps and closures, agricultural supports and stakes, paper and board coatings (e.g., for cups, plates, boxes, etc.), thermoformed products (e.g., trays, containers, lids, yoghurt pots, cup lids, plant pots, noodle bowls, moldings, etc.), housings (e.g., for electronics items, e.g., cell phones, PDA cases, music player cases, computer cases and the like), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), injection moldings (writing instruments, utensils, disk cases, etc.), solution and spun fibers and melt blown fabrics and non-wovens (threads, yarns, wipes, wadding, disposable absorbent articles), blow moldings (deep containers, bottles, etc.) and foamed articles (cups, bowls, plates, packaging, etc.).

Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Branching the polymer as described herein increases the melt strength of the polymer so that the sheet maintains is more readily processed and maintains its structural integrity. Measuring the sag of a sample piece of polymer when it is heated is therefore a way to measure the relative size of this processing window for thermoforming.

Because the branched polymers described herein have increased melt strength and increased processability, they are easier to convert to film or sheet form. They are therefore excellent candidates for thermoforming. Molded products include a number of different product types and, for example, including products such as disposable spoons, forks and knives, tubs, bowls, lids, cup lids, yogurt cups, and other containers, bottles and bottle-like containers, etc.

Blow molding, which is similar to thermoforming and is used to produce deep draw products such as bottles and similar products with deep interiors, also benefits from the increased elasticity and melt strength and reduced sag of the branched polymer compositions described herein.

The branched PHA compositions described herein is provided in any suitable form convenient for an intended application. For example, branched PHA is provided in pellet for to subsequently produce films, coatings, moldings or other articles, or the films, coatings, moldings and other articles is made directly as the branched PHA is produced. For instance, the articles is made from a linear or branched PHA by reactive extrusion, in which the thermolysis and the branching are done in-process, and where portions of the extrusion temperature and the residence time are sufficient for the thermolysis and branching steps. These steps are then followed immediately by either extrusion of the PHA in pellet form (for production at another time into finished articles), or processing of the branched PHA into finished articles immediately.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Testing Methods

Measurement of Molecular Weight of Polymers

Molecular weight (either weight-average molecular weight (Mw) or number-average molecular weight (Mn)) of PHA is estimated by gel permeation chromatography (GPC) using, e.g., a Waters Alliance HPLC System equipped with a refractive index detector. The column set is, for example, a series of three PLGel 10 micrometer Mixed-B (Polymer Labs, Amherst, Mass.) columns with chloroform as mobile phase pumped at 1 ml/min. The column set is calibrated with narrow distribution polystyrene standards.

The PHA sample is dissolved in chloroform at a concentration of 2.0 mg/ml at 60 C. The sample is filtered with a 0.2 micrometer Teflon syringe filter. A 50 microliter injection volume is used for the analysis.

The chromatogram is analyzed with, for example, Waters Empower GPC Analysis software. Molecular weights and PD are reported as polystyrene equivalent molecular weights.

The GPC method become inaccurate when measuring molecular weights over about one million. For polymers with such high molecular weights, the weight average molecular weight is estimated by flow injection polymer analysis (FIPA)

system (commercially available from, e.g., Viscotek Corp, Houston, Tex.) The polymer solution is eluted through a single, low volume size exclusion to separate polymer, solvent and impurities. The detection system consists of a refractive index, light scattering and viscosity group.

The polymer sample is dissolved in chloroform at a concentration of 2.0 mg/ml at 60 C. The sample is filtered with a 0.2 micrometer Teflon syringe filter. The FIPA unit operates at 45° C. with tetrahydrofuran mobile phase at a flow rate of 1.0 ml/min. A 100 microliter injection volume is used for the analysis.

The chromatogram is analyzed with, e.g., Viscotek OmniSec software. The absolute Mw is reported in grams/mole.

For PHA polymers, the absolute Mw (as measured by FIPA) is related to the Mw (as measured by GPC in polystyrene equivalents) by dividing the GPC value by approximately 1.3.

Measurement of Thermal Stability

The thermal stability of a polymer sample is measured in two different ways. The thermal stability is represented herein by a sample's "k," which shows the change in Mw over time. It can also be measured by melt capillary stability (MCS), which shows the change in the capillary shear viscosity over time.

To measure the thermal stability ("k") of a sample, a polymer specimen (e.g., 2 mg) is exposed to 170° C. in a DSC test chamber (e.g., a TA Instrument Q-2000), and the specimen heated for 0, 5 and 10 minutes. The cooled sample cup is unsealed and the sample dissolved in chloroform to the concentration required for gel permeation chromatography (GPC). GPC is used to measure Mw, Mn and Mz molecular weight averages of polymers, relative to a 900K polystyrene control.

The slope of the best-fit straight line of reciprocal weight-average molecular weight (1/Mw) versus time is the thermal stability of the sample in moles per gram per minute. A smaller "k" translates to better thermal stability.

The thermal stability of a sample is measured using a capillary rheometry test. Capillary rheometers are generally used to measure the melt viscosity of plastics as a function of shear rate (typically from about 0.1 to 10,000 $sec^{-1}$). However, measuring the melt viscosity of PHA polymers is complicated, because the molecular weight degradation reaction occurs at the test conditions themselves, which results in decreasing viscosity as a function of melt dwell time.

This obstacle is overcome by measuring the melt viscosity at various dwell times and extrapolating back to zero time (this is described in ASTM D3835-08). In the tests used herein, measurements are performed at 180° C. The material is preheated for 240 seconds (4 minutes) before the testing is commenced, and a capillary die of 0.75 mm diameter and 30 mm length is used. The measured apparent viscosity (as calculated from pressure and rate) decreases with increasing dwell time in the rheometer. When measured apparent viscosity (at an apparent shear rate of 100 $sec^{-1}$) is plotted as a function of time, the slope of this best-fit straight line is used as another indicator of thermal stability. This slope is referred to as "melt capillary stability," or MCS. The MCS number is negative, because viscosity decreases with time, and a larger magnitude (i.e., a smaller number) corresponds to poorer thermal stability. In other words, a negative number closer to zero is more desirable, and a larger negative number is less desirable.

Measuring G' Using Torsional Melt Rheometry

Torsional rheometry is used to measure the melt strength of a polymer. For purposes of simplicity, G' will be used herein, measured at an imposed frequency of 0.25 rad/s as a measure of "melt strength" (unless otherwise indicated). Higher G' translates to higher melt strength.

All oscillatory rheology measurements are performed using a TA Instruments AR2000 rheometer employing a strain amplitude of 1%. First, dry pellets (or powder) are molded into 25 mm diameter discs that are about 1200 microns in thickness. The disc specimens are molded in a compression molder set at about 165° C., with the molding time of about 30 seconds. These molded discs are then placed in between the 25 mm parallel plates of the AR2000 rheometer, equilibrated at 180° C., and subsequently cooled to 160° C. for the frequency sweep test. A gap of 800-900 microns is used, depending on the normal forces exerted by the polymer. The melt density of PHB is determined to be about 1.10 $g/cm^3$ at 160° C.; this value is used in all the calculations.

Specifically, the specimen disc is placed between the platens of the parallel plate rheometer set at 180° C. After the final gap is attained, excess material from the sides of the platens is scraped. The specimen is then cooled to 160° C. where the frequency scan (from 625 rad/s to 0.10 rad/s) is then performed; frequencies lower than 0.1 rad/s are avoided because of considerable degradation over the long time it takes for these lower frequency measurements. The specimen loading, gap adjustment and excess trimming, all carried out with the platens set at 180° C., takes about 2½ minutes. This is controlled to within ±10 seconds to minimize variability and sample degradation. Cooling from 180° C. to 160° C. (test temperature) is accomplished in about four minutes. Exposure to 180° C. ensures a completely molten polymer, while testing at 160° C. ensures minimal degradation during measurement.

During the frequency sweep performed at 160° C., the following data are collected as a function of measurement frequency: $|\eta^*|$ or complex viscosity, G' or elastic modulus (elastic or solid-like contribution to the viscosity) and G" or loss modulus (viscous or liquid-like contribution to the viscosity).

As used herein, G' measured at an imposed frequency of 0.25 rad/s (unless otherwise indicated) is used as a measure of "melt strength." Higher G' translates to higher melt strength.

Example 1

Effect of Heat Treatment on Branching

Experiments were carried out to demonstrate the effect of the thermolysis step on the branching of poly(3-hydroxybutyrate-co-8%-3-hydroxyvalerate) ("PHBV8") with t-butylperoxybenzoate (TBPB; from R.T. Vanderbilt Co., Norwalk Ct). Specifically, PHBV8 was thermolysed by heating at 210° C. in a single screw extruder (1 inch screw diameter, Welex Inc, Blue Bell, Pa.) operating at 40 RPM, resulting an average residence time of about 1.6 minutes, which reduced its weight average molecular weight to 263,000 from 458,000. The thermolysed PHBV8 as well as the original PHBV8 were then each mixed with 0%, 0.15%, or 0.30% (by weight) of the peroxide TBPB, and fed into a single screw extruder operating at 165° C. and 30 RPM, with an average residence time of about 2 minutes. At 165° C., CPK has a half-life of about 0.3 minutes. The molecular weights of the branched polymers obtained from the extruder were determined by GPC and shown in Table 1, below. Mw/Mw,0 is the molecular weight of the peroxide-treated polymer, divided by the Mw of the corresponding starting or initial polymer that was not peroxide-treated.

TABLE 1

Effect of thermolysis on molecular weights of branched PHA polymers

| Peroxide | Wt % Peroxide | Thermolysed | Mw | PD | Mw/Mw,o |
|---|---|---|---|---|---|
| TBPB | 0 | Y | 263,000 | 2.4 | 1.0 |
| TBPB | 0.15 | Y | 343,000 | 3.2 | 1.3 |
| TBPB | 0.30 | Y | 525,000 | 4.1 | 2.0 |
| TBPB | 0 | N | 458,000 | 2.3 | 1.0 |
| TBPB | 0.15 | N | 536,000 | 2.9 | 1.2 |
| TBPB | 0.30 | N | 616,000 | 4.4 | 1.3 |
| TBPB | 0.45 | N | 666,000 | 3.9 | 1.5 |

In both cases, increases in branching are observed as indicated by the increase in the weight average molecular weight ratio, Mw/Mw,o. Clearly, the increase in molecular weight, and hence the amount of branching, is greater for the thermolysed PHBV8 as indicated by the greater values of Mw/Mw,o at comparable levels of peroxide.

Example 2

Branching of PHA Polymers With TAEC

Branched PHAs were prepared using poly(3-hydroxybutyrate-co-8%-3-hydroxyvalerate) ("PHBV8") and poly(3-hydroxybutyrate-co-7%-4-hydroxybutyrate) ("PHB7") as the starting materials, and branching them with t-amylperoxy-2-ethylhexylcarbonate (TAEC). As measured by GPC, the PHBV8 starting polymer had a weight average molecular weight of 734,850 and a number average molecular weight of 288,571 g/mol. The PHB7 starting polymer had a weight average molecular weight of 505,000 and a number average molecular weight of 207,000 g/mol.

The PHBV8 and PHB7 were thermolysed by heating at 210° C. in a single screw extruder (1 inch screw diameter, Welex Inc, Blue Bell, Pa.) operating at 40 RPM, resulting an average residence time of about 1.6 minutes. The thermolysed PHBV8 had a weight average molecular weight of about 220,000 Daltons and a polydispersity (PD) index of about 2.7, while the PHB7 was 214,000 Daltons and had a PD of 8.4. Subsequently, the PHBV8 was mixed with 0.30, 0.45, or 0.60 wt % and the PHB7 was mixed with 0.40 wt % t-amylperoxy-2-ethylhexylcarbonate (TAEC). The mixtures were fed into the same extruder operating at 165° C. and 30 RPM, having an average residence time of about 2 minutes. TAEC has a half-life of about 0.3 minutes at 165° C. The molecular weights of the branched polymers obtained from the extruder were determined by gel permeation chromatography (GPC). Also calculated were the ratios of the weight average molecular weight of the branched PHA over the weight average molecular weight of the starting PHA. This data is provided in Table 2, below.

TABLE 2

Molecular Weights of PHA Polymers Thermolysed and Branched with TAEC.

| Polymer | Wt % TAEC | Mw | PD | Mw/Mw, o |
|---|---|---|---|---|
| PHBV8 | 0 | 220,000 | 2.7 | 1.0 |
| PHBV8 | 0.30 | 380,000 | 3.6 | 1.7 |
| PHBV8 | 0.45 | 600,000 | 5.7 | 2.8 |
| PHBV8 | 0.60 | 600,000 | 8.4 | 2.8 |
| PHB7 | 0 | 214,000 | 2.6 | 1.0 |
| PHB7 | 0.40 | 475,000 | 4.0 | 2.2 |

Unexpectedly, the branched polymer obtained from the mixture containing 0.30 wt % TAEC had a weight average molecular weight of about 380,000 Daltons and a polydispersity index of about 3.8. The branched polymer obtained from the mixture containing 0.45 wt % TAEC had a weight average molecular weight of about 600,000 Daltons and a polydispersity index of about 5.8. The branched polymer obtained from the mixture containing 0.60 wt % TAEC had a weight average molecular weight of about 600,000 Daltons and a polydispersity index of about 7.0. The column Mw/Mw,o shows the normalized increase in weight average molecular weight.

These results show that branching occurred, as evidenced by the increase in both the weight average molecular weight and polydispersity. Additionally, the level of molecular weight increase (Mw/Mw,o) is similar for PHBV8 and PHB7 at comparable levels of TAEC, indicating that the co-monomer component has a negligible effect on the branching reaction.

Example 3

Branching of PHA Polymers with TBPB and CPK

Other initiators were tested for their capability in inducing branching. Poly(3-hydroxy butyrate-co-11%-4-hydroxybutyrate) (PHB11) with a weight average molecular weight of 559,000 and a number average molecular weight of 278,000 was thermolysed under similar conditions as in Example 1, to a weight average molecular weight of about 270,000 Daltons. The polymer was then branched with t-butylperoxybenzoate (TBPB; Varox TBPB from R.T. Vanderbilt Co., Norwalk, Conn.) and 1,1-bis(t-butylperoxy)-3,3,5-trimethylcyclohexane (CPK; Varox 231 from R.T. Vanderbilt Co., Norwalk, Conn.) at levels of 0.15 and 0.30 wt %. The extruder was maintained at 165° C. For CPK, the extruder was operated at 60 RPM with an average residence time of about 1 minute. At 165° C., the half-life of CPK is about 0.3 minutes. For TBPB, the extruder was operated at 10 RPM with an average residence time of about 4.5 minutes. At 165° C., the half-life of TBPB is about 1 minute. The molecular weights of the branched polymers obtained from the extruder were determined by GPC as shown in Table 3, below.

TABLE 3

Molecular weights of PHA Polymers Thermolysed and Branched with TBPB and CPK.

| Peroxide | Wt % Peroxide | Mw | PD | Mw/Mw, o |
|---|---|---|---|---|
| TBPB | 0 | 270,000 | 2.0 | 1.0 |
| TBPB | 0.15 | 489,000 | 2.8 | 1.8 |
| TBPB | 0.30 | 537,000 | 3.2 | 2.0 |
| CPK | 0 | 267,000 | 2.6 | 1.0 |
| CPK | 0.15 | 315,000 | 2.6 | 1.2 |
| CPK | 0.30 | 382,000 | 2.6 | 1.4 |

When CPK was used as an initiator, the branched polymer obtained from thermolysed PHB 11 had a weight average molecular weight up to 2.0 times as high as the starting polymer with TBPB peroxide. Similarly, CPK peroxide effectively increases the weight average molecular weight.

These results show that various peroxides is used effectively if the decomposition temperature and residence time for the branching reaction is commensurate with the rate of decomposition (half-life) of the peroxide.

Example 4

Effect of Branching on Melt Strength

Rheological measurements were carried out to determine the effect of branching on the melt strength of PHA copolymer. The samples of PHB 11 from Example 3 that were branched using TBPB peroxide were analyzed further, by dynamic melt rheology at 160° C. using a Rheometrics RSA parallel plate rheometer. The (G') measured at 0.25 sec$^{-1}$ was used an a measure of melt strength of the branched polymer. The results are shown in Table 5, below.

TABLE 4

Effect of Branching on Melt Strength.

| Sample | Mw | PD | Mw/Mw, o | G'(Pa) |
|---|---|---|---|---|
| 1 | 270,000 | 2.0 | 1.0 | 19.3 |
| 2 | 489,000 | 2.8 | 1.8 | 2094 |
| 3 | 537,000 | 3.2 | 2.0 | 3752 |

The branched polymer obtained from the mixture without TBPB peroxide had a melt strength of about 19 Pa at 0.25 rad/s. The branched polymer obtained from the mixture containing 0.15 wt % TBPB had a melt strength of nearly 2100. The branched polymer obtained from the mixture containing 0.30 wt % TBPB had a melt strength of about 3800. Melt strength (G') is another measure of polymer branching, and confirms that the polymer is being branched.

Example 5

Effect of Cross-Linking Agents on Peroxide Branching

The polymerizable plasticizer diallyl phthalate (DAP) was tested for its ability to enhance branching of a PHA blend (about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent) by organic peroxide. Tert-butylperoxy-2-ethylhexylcarbonate (Triganox 117, manufactured by Akzo Nobel) was used as the peroxide. For comparison, the same compositions were prepared with the plasticizer Citraflex A4 (acetyl tri-n-butyl citrate, Vertellus) instead of DAP, and compounded with peroxide under the same conditions on a Leistritz MAXX 27 mm twin screw extruder at the temperatures (feed zone to die) 175/175/175/175/170/170/170/170/170/180/180° C. at 100 rpm and 50 lb/hr. The peroxide/plasticizer mixture was pumped at a constant controlled rate into the feeding zone of the extruder. Melt temperatures and pressures varied depending on the formulations and were in a range of 198-227° C. for the melt temperature and 1148-2810 psi for melt pressure. The highest melt temperature and pressure corresponds to the compounds' containing higher levels of DAP. The compositions and running conditions of the compounds are presented in Table 5, below.

TABLE 5

Compositions and Compounding Conditions for Samples Containing Peroxide Dispersed in Reactive cross-linking agent and Non-reactive Plasticizer.

| Ingredients (wt %) | 1 | 2 | 3 | 4 | 5 | 6 | 7 |
|---|---|---|---|---|---|---|---|
| PHA | 97 | 95 | 93 | 91 | 95 | 93 | 91 |
| Cyanuric acid 33% | 3 | 3 | 3 | 3 | 3 | 3 | 3 |
| 5% Triganox 117 in Citroflex A4 | | 2 | 4 | 6 | | | |
| 5% 117 in DAP | | | | | 2 | 4 | 6 |
| Total % Triganox 117 | | 0.1 | 0.2 | 0.3 | 0.1 | 0.2 | 0.3 |
| Leistritz conditions | | | | | | | |
| N rpm | 100 | 100 | 100 | 100 | 100 | 100 | 100 |
| Q lb/hr | 50 | 50 | 50 | 50 | 50 | 50 | 50 |
| Pump rate | 0 | 6.09 | 8.19 | 10.30 | 6.09 | 8.19 | 9.67 |
| Tm Minimum, | 203, | 198, | 198, | 198, | 214, | 218, | 223, |
| Tm Max | 204 | 198 | 202 | 199 | 214 | 220 | 227 |
| Pm minimun | 1238, | 1300, | 1291, | 1324, | 2506, | 2792, | 2658, |
| Pm max | 1148 | 1344 | 1398 | 1377 | 2515 | 2810 | 2788 |
| Torque % | 63 | 60 | 56-58 | 56-57 | 69-70 | 69-70 | 61 |

The value of G' measured at low frequencies is used as an assessment of melt strength, which is important for a number of applications including thermoforming, extrusion of blown film, extrusion coating, etc. When the peroxide is dispersed in DAP, the melt strength increases about eight times that of the highest loading of Triganox 117 alone, and about three times that of the lowest loading of the peroxide alone. This clearly demonstrates that G', is significantly enhanced when peroxide Triganox 117 is blended with DAP plasticizer. FIG. 1 shows the change in G' (i.e., melt strength) with different levels of peroxide and DAP. While increasing levels of the peroxide (in Citroflex A4) did cause an increase in G', this effect was greatly enhanced by the inclusion of DAP.

The molecular weight (Mw and Mn), temperature of crystallization, and the melting and glass transition temperatures were measured by GPC and DSC, and are shown in Table 6, below.

TABLE 6

Properties of Formulations Containing Peroxide Dispersed in Reactive
Cross-linking agents and Non-reactive Plasticizers.

| Formulation | 1 | 2 | 3 | 4 | 5 | 6 | 7 |
|---|---|---|---|---|---|---|---|
| G' @0.25 rad/s | 28.97 | 287 | 274 | 377 | 917 | 2453 | 3100 |
| Mw | 350,075 | 409,206 | 441,435 | 486,204 | 505,992 | 385,091 | 299,409 |
| Mn | 129,448 | 151,192 | 156,825 | 166,486 | 142,473 | 114,762 | 94,538 |
| PD | 2.704 | 2.707 | 2.815 | 2.920 | 3.551 | 3.356 | 3.167 |
| % increase Mw | | 16.891 | 26.097 | 38.886 | 44.538 | 10.003 | −14.473 |
| % increase Mn | | 16.797 | 21.149 | 28.612 | 10.062 | −11.345 | −26.969 |
| Tg | −1.21 | −7.27 | −13.13 | −18.14 | −4.41 | −3.29 | −1.18 |
| T peak cryst | 111.28 | 108.98 | 108.24 | 107.60 | 107.93 | 108.37 | 108.87 |
| T onset cryst | 114.42 | 112.10 | 111.36 | 110.69 | 111.39 | 112.94 | 114.20 |
| ΔH cryst | 54.23 | 50.40 | 48.30 | 46.91 | 50.19 | 47.91 | 45.16 |
| Tm start | 162.64 | 158.17 | 156.86 | 150.81 | 156.51 | 157.45 | 157.25 |
| Tm max | 172.68 | 168.65 | 167.51 | 166.74 | 167.42 | 167.47 | 167.01 |

As a rule, the molecular weight of PHA increases with addition of the peroxide/plasticizer mixture. The exceptions are the compounds with high loadings of peroxide/DAP where the highly branched material could have limited solubility in a solvent during GPC analysis, or where the products of decomposition of the peroxide during extrusion could have interfered because of the poor venting at the time.

The peak crystallization and the onset of crystallization temperatures were found to be negatively affected by the addition of the plasticizer/peroxide blend. Should the rate of crystallization become an important processing requirement, the modification of a compound to improve its crystallization rate should be conducted. For some processes, e.g., thermoforming or lower speed extrusion lines with good heat exchange, the slower crystallization should not be a major factor affecting performance.

This demonstrates that blending of an organic peroxide and DAP is used as an important processing aid for applications requiring high melt strength. Example 6. Effect of Different Cross-linking agents of Acrylic and Methacrylic Acid Esters on Branching.

Some of the polymers made in the examples above had a strong residual odor from the peroxide. This is generally undesirable in a commercial product. Additional experiments showed that diallyl phthalate (DAP) at levels of 0.1% allowed one to decrease the amount of Triganox 117 to 0.05% and still achieve effective branching. This example therefore examined additional cross-linking agent candidates for their ability to enhance peroxide-induced branching, and to outperform DAP in doing so. Various esters of acrylic and methacrylic acids were selected, including pentaerythritol tetraacrylate, trimethylolpropane triacrylate, pentaerythritol triacrylate, dipentaerythritol pentaacrylate, diethylene glycol dimethacrylate, and bis(2-methacryloxyethyl)phosphate.

These were tested for their ability to enhance branching of a PHA blend (about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent) by the organic peroxide tert-butylperoxy-2-ethylhexylcarbonate (Triganox 117, manufactured by Akzo Nobel).

Each test formulation contained 95% PHA, 3% nucleating agent (33%). The remaining 2% in each formulation was made up of Triganox 117 and reactive esters in Citroflex A4. The formulations were compounded on a Leistritz MAXX 27 mm twin screw extruder 100 rpm, 60 lb/hr, 57-59% torque with Tm (melting temperature) 205-209° C., Pm (melt pressure) 1915-2090 psi. For each combination tested, the elastic modulus or melt strength (G') was measured at 160° C. and 0.25 rad/second.

The amount of Triganox 117 and reactive esters in each formulation are as indicated in Table 7, below, which also provides the G' measured for each of these test formulations.

TABLE 7

Formulations Containing Pentaerythritol Triacrylate as a Cross-
linking agent, and the G' (melt strength) measured for each.

| Reactive Cross-linking agent | 0% 117 | 0.03% 117 | 0.05% 117 | 0.07% 117 |
|---|---|---|---|---|
| 0% pentaerythritol triacrylate | 128.8 | | 247.8 | |
| 0.05% pentaerythritol triacrylate | | | 552.8 | |
| 0.09% pentaerythritol triacrylate | | 520.5 | 605.35 | |
| 0% trimethylolpropane triacrylate | 128.8 | | 247.8 | |
| 0.05% trimethylolpropane triacrylate | | | 524.2 | |
| 0.08% trimethylolpropane triacrylate | | 505.4 | 547.6 | |
| 0% dipentaerythritol pentaacrylate | 128.8 | | 247.8 | |
| 0.04% dipentaerythritol pentaacrylate | | 347.3 | 471.3 | |
| 0.07% dipentaerythritol pentaacrylate | | | 538.6 | |
| 0% pentaerythritol tetraacrylate | 128.8 | | 247.8 | 310.8 |
| 0.05% pentaerythritol tetraacrylate | | | 384.5 | |
| 0.08% pentaerythritol tetraacrylate | | 416.6 | 472.4 | |
| 0% diethylene glycol dimethacrylate | 128.8 | | 247.8 | |
| 0.06% diethylene glycol dimethacrylate | | | 241.5 | |
| 0.10% diethylene glycol dimethacrylate | | | 237.8 | |
| 0% bis(2-methacryloxyethyl)phosphate | 128.8 | | 247.8 | |
| 0.10% bis(2-methacryloxyethyl)phosphate | | | 460.0 | |

Figure 2:
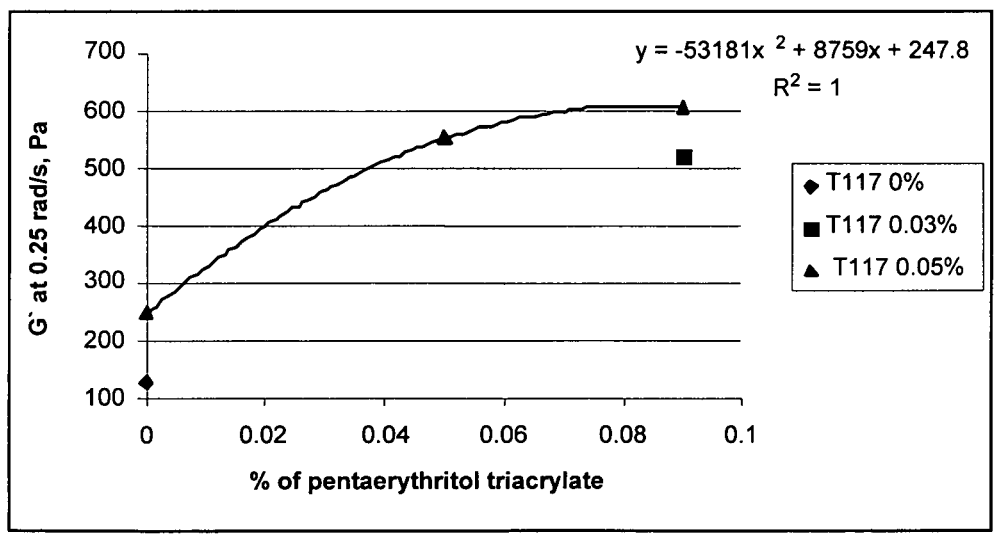
FIG. 2 is a plot of the change in G' (y-axis) as a function of the total peroxide Triganox 117 with and without varying amounts of the cross-linking agent pentaerythritol triacrylate (x-axis).

As shown in FIG. 2, pentaerythritol triacrylate increased the G' from 247.8 Pa to 552.8 Pa at 0.05% of the cross-linking agent, and to 605.3 Pa at 0.09% cross-linking agent in conjunction with 0.05% Triganox 117.

Figure 3:
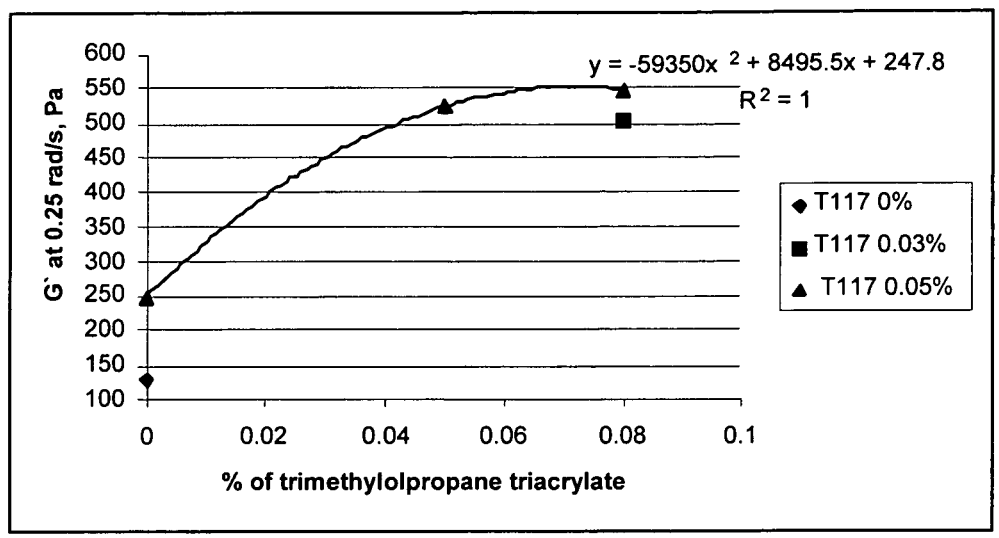
FIG. 3 is a plot of the change in G' (y-axis) as a function of the total peroxide Triganox 117 with and without varying amounts of the cross-linking agent trimethylolpropane triacrylate (x-axis).

FIG. 3 shows the effect of trimethylolpropane triacrylate cross-linking agent on branching (as measured by G') with Triganox 117. The cross-linking agent also showed a significant increase in G'.

Figure 4:
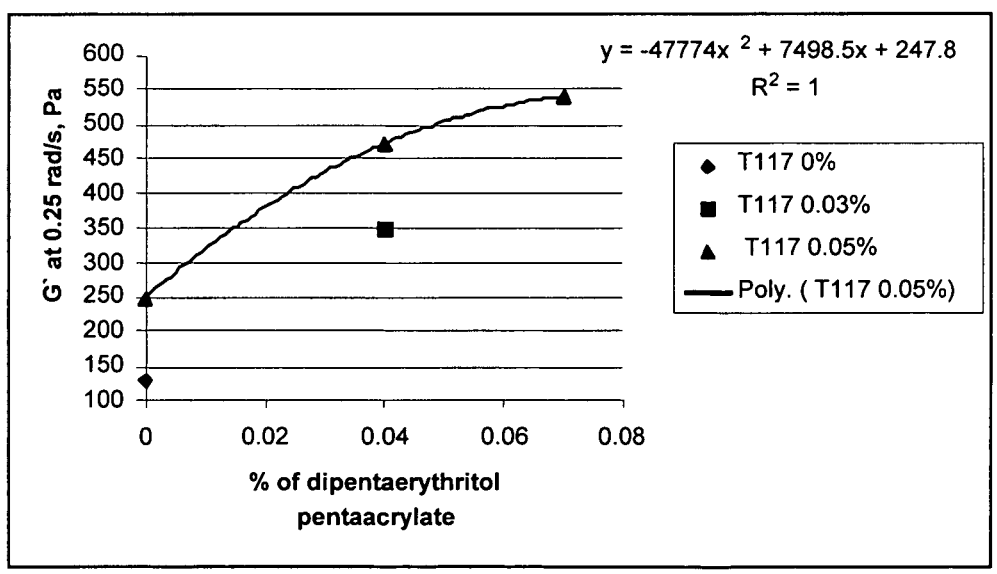
FIG. 4 is a plot of the change in G' (y-axis) as a function of the total peroxide Triganox 117 with and without varying amounts of the cross-linking agent dipentaerythritol pentaacrylate (x-axis).

Inclusion of cross-linking agent dipentaerythritol pentaacrylate (FIG. 4) caused the G' to increase to 471.3 at 0.04% cross-linking agent, and to 538.6 Pa for 0.07% cross-linking agent.

Figure 5:
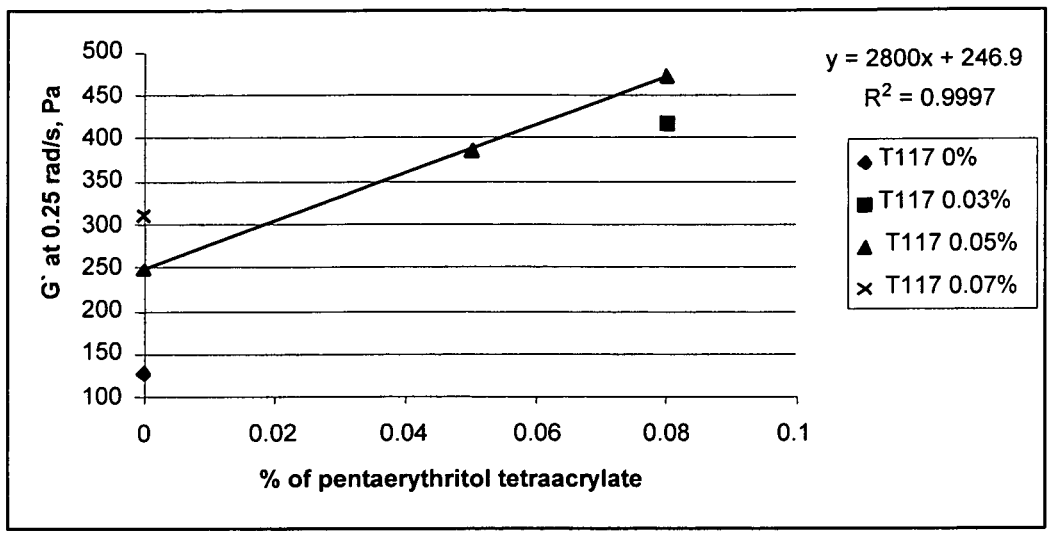
FIG. 5 is a plot of the change in G' (y-axis) as a function of the total peroxide Triganox 117 with and without varying amounts of the cross-linking agent pentaerythritol tetraacrylate (x-axis).

When pentaerythritol tetraacrylate was added as a cross-linking agent, 0.08% caused the G' to nearly double (FIG. 5).

Figure 6:
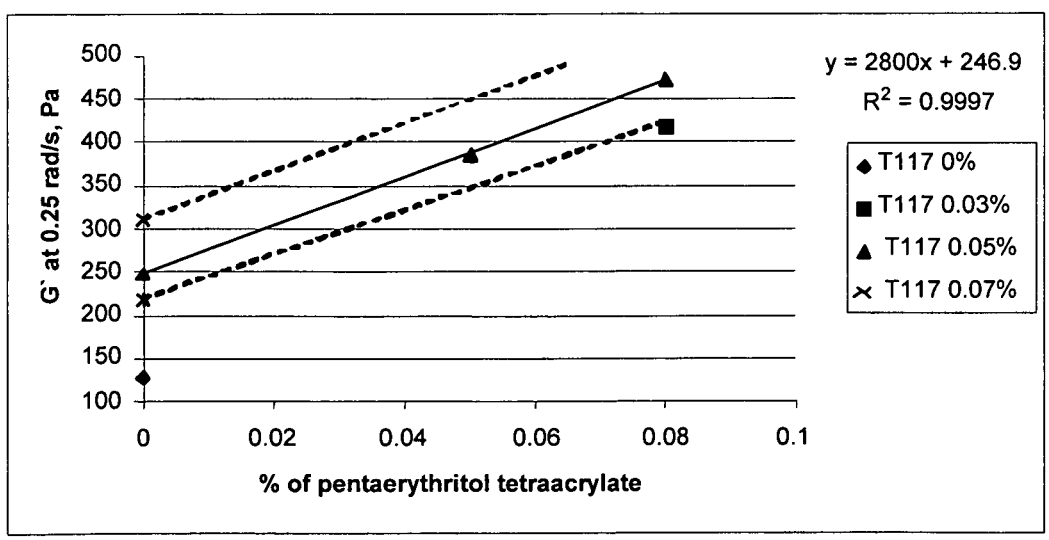
FIG. 6 is a plot showing the effect of up to 0.07% peroxide Triganox 117, with and without varying amounts of the cross-linking agent pentaerythritol tetraacrylate (x-axis), on G'.

As shown in FIG. 6, increased G' is achieved with 0.07% Triganox 117. All of the cross-linking agents had less of an effect when added to 0.03% Triganox 117, but their enhancement of G' was still evident.

Figure 7:
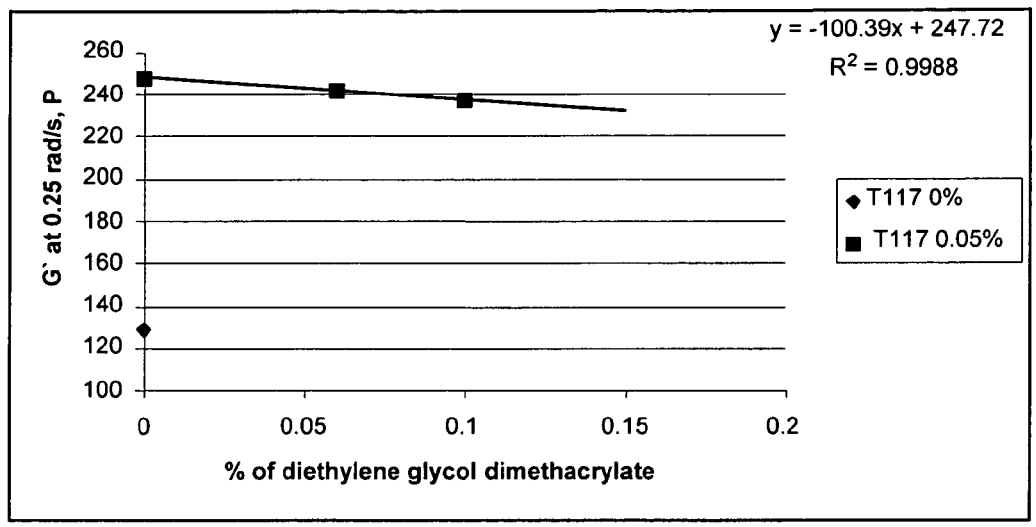
FIG. 7 is a plot of the change in G' (y-axis) as a function of the total peroxide Triganox 117 with and without varying amounts of the cross-linking agent diethylene glycol dimethacrylate (x-axis).

Interestingly, diethylene glycol dimethacrylate appeared to produce no increase in G'. This is shown in FIG. 7. This cross-linking agent contains a methacrylate, rather than an acrylate. Methacrylates are monomers with a ceiling temperature (i.e., a maximum temperature) for polymerization, beyond which there is no enhanced crystallization. Acrylates do not have ceiling temperatures. It is possible that this ceiling temperature may limit the effectiveness of this compound as a cross-linking agent.

Inclusion of bis(2-methacryloxyethyl)phosphate as a cross-linking agent cause the G' to increase from 247.8 Pa to 460.0 Pa for 0.05% Triganox 117.

Figure 8:
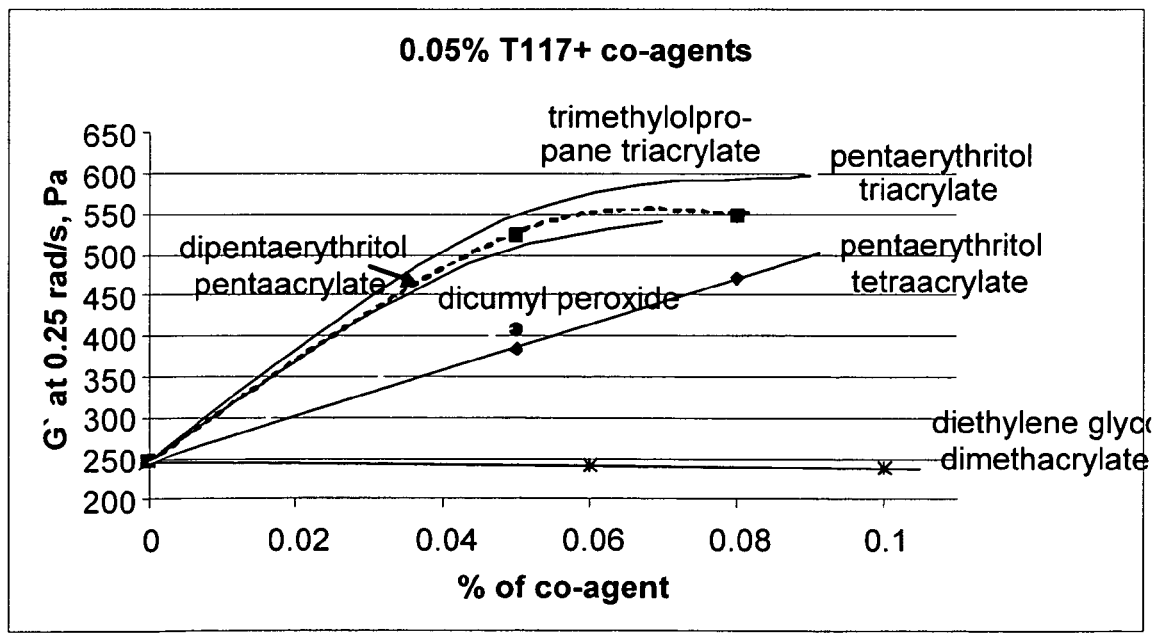
FIG. 8 is a plot of the change in G' (y-axis) as a function of the total peroxide Triganox 117 with and without varying amounts of the different cross-linking agents (x-axis).

FIG. 8 summarizes the effects of the various cross-linking agents when added to PHA with 0.05% Triganox 117. This example shows that even when used in very small amounts (0.04-0.09%), acrylates are extremely efficient in formation of branched networks in PHAs, and outperform DAP by a factor of 2.5 when added to 0.05% of Triganox 117. The cross-linking agents is used to induce changes in physical and rheological properties, improving melt strength, elasticity, and resilience, and increasing modulus and tensile strength.

Example 7

Effect of Dicumyl Peroxide on Branching

Dicumyl peroxide was also tested for its effect on branching as compared with Triganox 117. Formulations containing dicumyl peroxide were made as for Example 7, above. The formulations made and the G' measured for each are shown in the table below.

TABLE 8

Effect of Dicumyl Peroxide on G'

| Reactive Cross-linking agent | 0% T117 | 0.03% T117 | 0.05% T117 |
|---|---|---|---|
| 0% dicumyl peroxide | 128.8 | | 247.8 |
| 0.025% dicumyl peroxide | | 220.1 | |
| 0.05% dicumyl peroxide | | | 408.4 |

Figure 9:
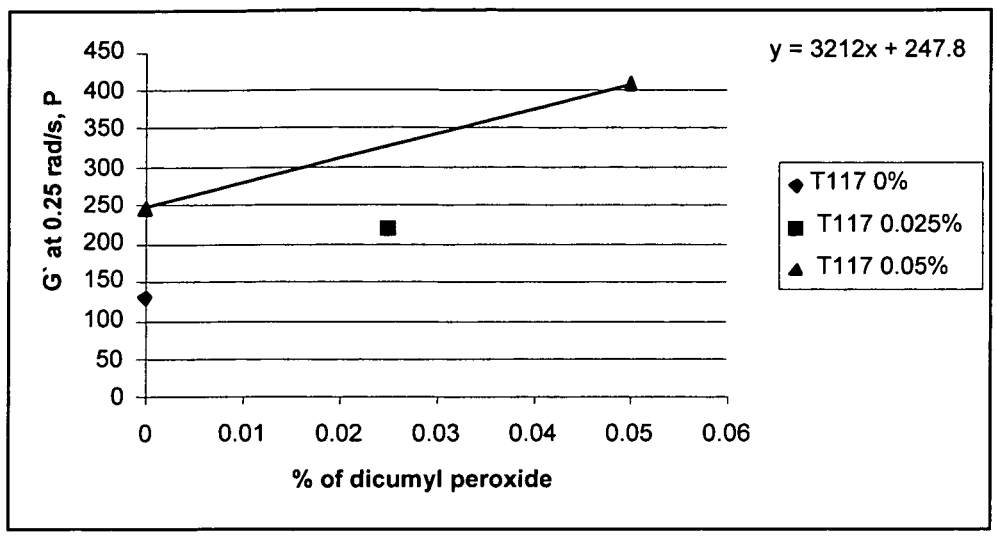
FIG. 9 is a plot of the change in G' (y-axis) as a function of increasing amounts of the peroxide dicumyl peroxide (x-axis).
Figure 10:
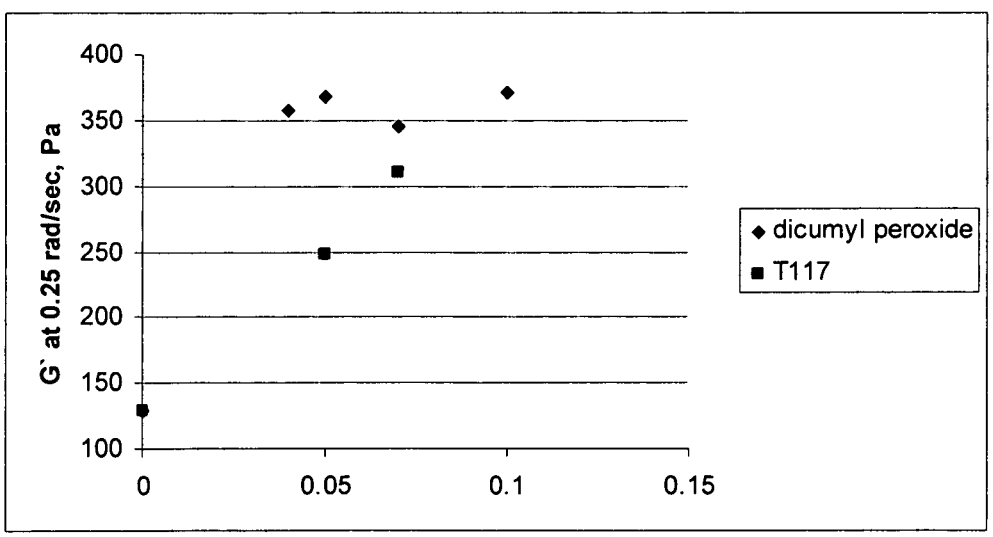
FIG. 10 is a plot of the change in G' (y-axis) as a function of varying amounts of the peroxides Triganox 117 and dicumyl peroxide (x-axis).

These results are also shown in FIG. 9. Additional data showed that dicumyl peroxide by itself is more efficient at branching than Triganox 117, as shown in FIG. 10.

Example 8

Comparison of Tert-Amylperoxy 2-Ethylhexyl Carbonate and Tert-Butylperoxy 2-Ethylhexyl Carbonate Two peroxides, tert-butylperoxy-2-ethylhexylcarbonate (Trigonox 117, available from Akzo Nobel) and tert-amylperoxy-2-ethylhexylcarbonate (Trigonox 131, available from Akzo Nobel) were compared at levels of 0.05, 0.15 and 0.25 wt % in a PHA blend (about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent). The peroxide was pumped to a Leistritz MAXX 27 mm twin screw extruder operating at a temperature profile of 175/175/170/170/170/165/165/165/160/160 (° C., throat to die) and 130 rpm. The PHA blend was fed at 85 lbs/hr along with 1% nucleating agent and 8% plasticizer (e.g., acetyl tri-n-butyl citrate, e.g., Citroflex A4). The torque was 44-47%, the melt temperature was 179-182° C. and the die pressure 1900-2200 psi for all blends.

The resulting PHA formulations were compared for crystallization and rheological properties, which are shown in the table below.

TABLE 9

PHA Compositions Containing Two Different Peroxides, and Test Results

| Peroxide | Wt % | G' (Pa) | G'/G' 0 | Tcr (° C.) |
|---|---|---|---|---|
| Triganox 117 | 0.00 | 92.8 | — | 103.7 |
| Triganox 117 | 0.05 | 285.3 | 3.07 | 103.9 |
| Triganox 117 | 0.15 | 801.6 | 8.64 | 104.2 |
| Triganox 117 | 0.25 | 1078.0 | 11.62 | 104.0 |
| Triganox 131 | 0.00 | 92.8 | — | 103. |
| Triganox 131 | 0.05 | 314.0 | 3.38 | 104.2 |
| Triganox 131 | 0.15 | 570.5 | 6.15 | 103.7 |
| Triganox 131 | 0.25 | 759.2 | 8.18 | 103.7 |

These results show that similar increase in melt strength can readily be achieved with either of these two peroxides. The peak crystallization temperature is unaffected by the branching process.

Example 9

Comparison of 2,5-Dimethyl-2,5-di(tert-Butylperoxy)Hexane, n-Butyl-4,4-di-(tert-Butylperoxy)Valerate and tert-Bultylperoxy-2-Ethylhexylcarbonate Two additional peroxides 2,5-dimethyl-2,5-di(tert-butylperoxy)hexane (Trigonox 101), and n-butyl-4,4-di-(tert-butylperoxy)valerate (Trigonox 17) (both available from Akzo Nobel) were compared to tert-butylperoxy-2-ethylhexyl carbonate (Trigonox 117). Two PHA blends, a blend of about 18-22% homo-polymer of 3-hydroxybutanoic acid, and about 78-82% co-polymer of 3-hydroxybutanoic acid and 4-hydroxybutanoic acid, where the 4-hydroxybutanoic acid is approximately 8-14% weight percent (PHA Blend 1), and a blend of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent (PHA Blend 2), were compounded as in Example 9 except that the extruder was operated with a temperature profile of 150/180/180/150/160/165/165/165/165/165° C., 100 rpm and 35 lbs/hr. The results are shown in the table below.

TABLE 10

PHA Compositions Containing Three Different Peroxides, and Test Results

| Peroxide | Wt % | PHA Blend | G' (Pa) | G'/G' 0 |
|---|---|---|---|---|
| Triganox 117 | 0.00 | PHA Blend 1 | 10.4 | — |
| Triganox 117 | 0.16 | PHA Blend 1 | 202.8 | 19.50 |
| Triganox 117 | 0.33 | PHA Blend 1 | 294.3 | 28.30 |
| Triganox 101 | 0.00 | PHA Blend 1 | 51.3 | — |
| Triganox 101 | 0.30 | PHA Blend 1 | 192.9 | 3.76 |
| Triganox 17 | 0.00 | PHA Blend 1 | 10.4 | — |
| Triganox 17 | 0.16 | PHA Blend 1 | 3.3 | 0.32 |
| Triganox 17 | 0.33 | PHA Blend 1 | 80.6 | 7.75 |
| Triganox 17 | 0.50 | PHA Blend 1 | 214.7 | 20.64 |
| Triganox 117 | 0.00 | PHA Blend 2 | 92.8 | — |

TABLE 10-continued

PHA Compositions Containing Three Different Peroxides, and Test Results

| Peroxide | Wt % | PHA Blend | G' (Pa) | G'/G' 0 |
|---|---|---|---|---|
| Triganox 117 | 0.16 | PHA Blend 2 | 134.2 | 1.45 |
| Triganox 117 | 0.33 | PHA Blend 2 | 272.3 | 2.93 |

These peroxides all induce PHA branching to comparable levels. The extent of branching is controlled by adjusting the amount of peroxide added.

Example 10

Thermoforming of Branched Polyhydroxyalkanoate

A copolymer mixture of average composition poly(3-hydroxybutyrate-co-6.6%-4-hydroxybutyrate) and 1% nucleating agent was concurrently compounded and branched in a Leistritz 27MAXX twin screw extruder operating at set temperatures 175° C. (zones 1 to 5) followed by 170° C. (zones 6 to 10), 185 RPM and 80 lbs. per hour feed rate. 0.09% Trigonox 117 (peroxide) and 0.09% pentaerythritol triacrylate (cross-linking agent) was added along with 2% acetylcitrate tributyrate plasticizer (a non-reactive plasticizer). 10% Flextalc 610D was added downstream via a side stuffer. The extruded strand was passed through a water bath operating at 60° C., pelletized, and dried for four hours in a −40° C. dewpoint, dessicated air dryer operating at 80° C. A control sample without peroxide and coagent was similarly produced.

The pellets were extruded into a sheet 0.020 inches thick on a Johnson 2-inch single screw extruder operating at 170° C., 75 rpm and equipped with a 24-inch variable lip coat hanger die operating at 160° C.

The sag of sheet was assessed by heating a clamped 6 by 6 inch piece of sheet under an infrared heater (Model 101 vacuum former, T&S Dental and Plastics, Myerstown, Pa.) operating at 77 volts for a heating time of 30 seconds. At the end of the heating period, the heater was removed from the clamped sample and the sample allow to continue to sag and cool until it has recrystallized (about 1 minute). The sag was measured as about 1 inch for the control sample and essentially zero for the branched material.

The sheet was thermoformed on a Lyle Model PM thermoformer (Lyle Co., Beaverton, Mich.) equipped with a bowl mold having a draw of about 1.5 inches deep. The heaters were set at 260° C. and the sheet heated for about 12 seconds. The part was formed by plug and pressure assisted forming and then allowed to crystallize in the mold. Uniform, quality parts were made.

Example 11

Effect of Polybutylmethacrylate (PBMA) on Branching

Polybutylmethacrylate (PBMA or P(BMA)) is an acrylate, and was evaluated in this example for its potential use as a cross-linking agent in the melt strength of PHAs as measured by G'.

TABLE 11

PHA Compositions Containing PBMA, and Test Results

| Ingredients (wt %) & Test Results | Formulation 1 | Formulation 2 | Formulation 3 | Formulation 4 |
|---|---|---|---|---|
| PHA Blend | 97 | 92 | 87 | 77 |
| Nucleating Masterbatch | 3 | 3 | 3 | 3 |
| PBMA | 0 | 5 | 10 | 20 |
| G' | 20.89 | 42.3 | 121.6 | 292 |
| G'/G'0 | 1.0 | 2.0 | 5.8 | 14.0 |
| Tg (° C.) | −6.76 | −6.07 | −5.24 | −7.67 |
| Tpc (° C.) | 112.8 | 113.13 | 111.91 | 111.77 |
| Toc (° C.) | 115.46 | 115.98 | 115.38 | 115.09 |
| Mw (g/mol) | 540,202 | 536,120 | 561,865 | 626,521 |
| Mn (g/mol) | 216,001 | 191,095 | 206,611 | 168,545 |
| PD (Mw/Mn) | 2.5 | 2.8 | 2.7 | 3.7 |
| % increase in Mw | — | −0.76 | 4.01 | 15.98 |
| % increase in Mn | — | −11.53 | −4.35 | −21.97 |

The PHA blend was composed of about 58-62% homopolymer or 3-hydroxybutanoic acid, and about 38-42% copolymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

The PBMA was obtained from Scientific Polymer Products, Inc. (Ontario, N.Y., USA), and had a molecular weight of 180,000 g/mol, a Tg (glass transition temperature) of 15° C. (as reported by the manufacturer).

Compounding was done in a Brabender twin screw extruder set at 180/175/170° C., at 50 RPM. The extruder was fitted with a single strand die, and the strand was passed through a water bath maintained at 60° C., and was chopped into pellets.

The data in the table above show a 14-fold increase in G'/gG'0 with the addition of 20% PBMA. Increases of 2× and nearly 6× were seen with additions of 5% and 10% PBMA, respectively. There was also a slight increase in molecules having a higher weight-average molecular weight (Mw), and a reduction in Mn, indicating a reduction of lower-weight molecular weight molecules. Polydispersity also increased, indicating increasing lack of uniformity of chain lengths. Crystallization kinetics were largely unaffected, and the same was true of peak crystallization temperature (Tpc) and onset of crystallization temperature (Toc).

Example 12

Effect of Polybutylmethacrylate (PBMA) on Branching

Polybutylmethacrylate (PBMA) obtained from Sigma Aldrich (St. Louis, Mo., USA). Polybutylmethacrylate (PBMA or P(BMA)) is an acrylate, and was evaluated in this example for its potential use as a cross-linking agent in increasing the melt strength of PHAs as measured by G'. The PBMA had a molecular weight of 337,000 g/mol.

TABLE 12

PHA Compositions Containing PBMA, and Test Results

| Ingredients (wt %) & Test Results | Formulation 1 | Formulation 2 | Formulation 3 | Formulation 4 |
|---|---|---|---|---|
| PHA Blend | 97 | 92 | 87 | 82 |
| Nucleating Masterbatch | 3 | 3 | 3 | 3 |
| PBMA | 0 | 5 | 10 | 15 |
| G' | 125.1 | 458.5 | 1011 | 1698 |
| G'/G'0 | 1.0 | 3.67 | 8.08 | 13.57 |
| Tg (° C.) | −3.1 | −3.5 | −2.59 | −3.64 |
| Tpc (° C.) | 112.47 | 111.66 | 112.5 | 112.66 |
| Mw (g.mol) | 528,597 | 513,775 | 549,755 | 641,317 |
| Mn (g.mol) | 221,084 | 184,207 | 190,368 | 165,481 |
| PD (Mw/Mn) | 2.4 | 2.8 | 2.9 | 3.9 |
| % increase in Mw | — | −2.80 | 4.00 | 21.32 |
| % increase in Mn | — | −16.68 | −13.89 | −25.15 |

The PHA blend was composed of about 58-62% homopolymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

Compounding was done in a Brabender twin screw extruder set at 180/175/170° C., at 50 RPM. The extruder was fitted with a single strand die, and the strand was passed through a water bath maintained at 60° C., and was chopped into pellets.

The data in the table above show a 4-fold, 8-fold and 14-fold increase in G'/G'0 with the addition of 5%, 10% and 15% PBMA, respectively. Graphing of the data (not shown) reveals that lower levels of PBMA improve G' by more than an order of magnitude. Higher molecular weight PBMA appears to have a greater effect on G' than lower molecular weight PBMA. There was also an increase in molecules having a higher weight-average molecular weight (Mw), and a reduction in Mn, indicating a reduction of lower-weight molecular weight molecules. Polydispersity also increased, indicating increasing lack of uniformity of chain lengths.

Example 13.-15

Omitted

Example 16

Effect of Styrene Glycidyl Methacrylate on Branching

Joncryl ADR 4368-CS is styrene glycidyl methacrylate, and it was evaluated for its potential use in increasing the melt strenght of PHA compound as measured by G'. The Joncryl ADR 4368-CS was purchased from BASF. It was added to a PHA blend at levels of 0.5, 1 and 2% by weight, as shown in the table below.

TABLE 16

PHA Compositions Containing Styrene Glycidyl Methacrylate, and Test Results.

| Ingredients (wt %) & Test Results | Formulation 1 | Formulation 2 | Formulation 3 | Formulation 4 |
|---|---|---|---|---|
| PHA Blend | 97 | 96.5 | 96 | 95 |
| Nucleating Masterbatch | 3 | 3 | 3 | 3 |
| Joncryl ADR 4368-CS | 0 | 0.5 | 1 | 2 |
| G' | 30.5 | 40.0 | 52.3 | 84.4 |
| G'/G'0 | — | 1.31 | 1.71 | 2.77 |
| Tg (° C.) | −7.12 | −5.47 | −4.94 | −5.06 |
| Tpc (° C.) | 112.29 | 113.31 | 113.33 | 110.05 |
| Toc (° C.) | 115.06 | 116.01 | 116.23 | 113.77 |
| Mw (g/mol) | 495,524 | 484,207 | 491,754 | 559,503 |
| Mn (g/mol) | 184,911 | 189,922 | 186,127 | 206,251 |
| PD (Mw/Mn) | 2.68 | 2.55 | 2.64 | 2.71 |
| % increase in Mw | — | −2.28 | −0.76 | 12.91 |
| % increase in Mn | — | 2.71 | 0.66 | 11.54 |

The PHA blend was composed of about 58-62% homopolymer of 3-hydroxybutanoic acid, and about 38-42% co-polymer of 3-hydroxybutanoic acid and 4-hydroxybutanoic acid, where the 4-hydroxybutanoic acid is approximately 8-14% percent weight. The nucleating masterbatch was cyanuric acid that had been previously compounded at a rate of 33% (by weight) into a base resin of 3-hydroxybutanoic acid and 4-hydroxybutanoic acid, and pelleted.

Compounding was done in a Brabender twin screw extruder set at 180/175/170° C., at 50 RPM.

When the Joncryl ADR 4368-CS was added, G' increased. At a rate of 2%, the Mw and Mn increased by 13% and 12%, respectively, confirming that Joncryl has chain extension functionality. Crystallization was not adversely affected.

Example 17

Effect of Poly(2-Hydroxyethyl Methacrylate) on Branching

Poly(2-hydroxyethyl methacrylate) (P(2OH-e-MA)) was evaluated for its potential use in increasing the melt strength of PHAs as measured by G'. The compound was purchased from Scientific Polymer Products, Inc. (Ontario, N.Y., USA), and had a molecular weight of 300,000 g/mol, and a Tg of 55 C. It was added to a PHA blend at levels of 5, 10 and 20% by weight, as shown in the table below.

TABLE 17

PHA Compositions Containing Poly(2-hydroxyethyl methacrylate) and Test Results.

| Ingredients (wt %) & Test Results | Formulation 1 | Formulation 2 | Formulation 3 | Formulation 4 |
|---|---|---|---|---|
| PHA Blend | 97 | 92 | 87 | 77 |
| Nucleating Masterbatch | 3 | 3 | 3 | 3 |
| P(2OH-e-MA) | 0 | 5 | 10 | 20 |
| G' | 15 | 45 | 51 | 249 |
| G'/G'0 | — | 3.0 | 3.4 | 16.6 |
| Tpc (° C.) | 113.48 | 113.80 | 113.61 | 112.56 |
| Toc (° C.) | 116.02 | 116.39 | 116.47 | 115.60 |

The PHA blend was composed of about 58-62% homopolymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

Compounding was done in a Brabender twin screw extruder set at 180/175/170° C., at 50 RPM.

When the poly(2-hydroxyethyl methacrylate) was added at a rate of 20%, the G' was increased by about 17-fold, indicating branching of the polymer. Crystallization was not adversely affected.

Example 18 and Table 18

Omitted

Example 19

Effect of Ethylene Copolymer on Branching

Biomax Strong 100 is an ethylene copolymer, and is sold by du Pont (Wilmington, Del., USA) as an additive for toughening PLA (polylactic acid). It was evaluated for its potential use in increasing the melt strength of PHAs as measured by G'. It was added to a PHA blend at levels of 5, 10, 15 and 20% by weight, as shown in the table below.

TABLE 19

PHA compositions containing ethylene copolymer, and test results.

| Ingredients (wt %) & Test Results | Form. 1 | Form. 2 | Form. 3 | Form. 4 | Form. 5 |
|---|---|---|---|---|---|
| PHA Blend | 97 | 92 | 87 | 82 | 77 |
| Nucleating Masterbatch | 3 | 3 | 3 | 3 | 3 |
| Biomax Strong 100 | 0 | 5 | 10 | 15 | 20 |
| G' (Formulations 2-4) | 26 | 34 | 207 | 214 | |
| G' (Formulations 3-5) | 35 | | 158 | 198 | 188 |
| G'/G'0 | — | 1.31 | 6.24 | 6.94 | 5.37 |
| Tpc (° C.) | 113.44 | 113.24 | 112.27 | 112.29 | 112.24 |
| Toc (° C.) | 116.09 | | 115.26 | 115.35 | 115.48 |

The PHA blend was composed of about 58-62% homopolymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

Compounding was done in a Brabender twin screw extruder set at 180/175/170° C., at 50 RPM.

When the Biomax Strong 100 was added at a rate of 10, 15% and 20%, it provided an increase in G', indicating branching of the polymer. It also slowed crystallization somewhat.

Example 20

Effect of Ethylene-n-Butyl Acrylate-Glycidyl Methyl Acetate on Branching

Elvaloy PTW is a copolymer of ethylene-n-butyl acrylate-glycidyl methyl acetate, and is sold by du Pont (Wilmington, Del., USA) as a toughening additive. It was evaluated for its potential use in increasing melt strength of PHAs as measured by G'. It was added to a PHA blend at levels of 5, 10, 15 and 20% by weight, as shown in the table below.

TABLE 20

PHA compositions containing ethylene-n-butyl acrylate-glycidyl methyl acetate copolymer, and test results.

| Ingredients (wt %) & Test Results | Form. 1 | Form. 2 | Form. 3 | Form. 4 | Form. 5 |
|---|---|---|---|---|---|
| PHA | 97 | 92 | 87 | 82 | 77 |
| Nucleating Masterbatch | 3 | 3 | 3 | 3 | 3 |
| Elvaloy PTW | 0 | 5 | 10 | 15 | 20 |
| G' | 30 | 62 | 104 | 134 | 156 |
| G'/G'0 | — | 2.07 | 3.47 | 4.47 | 5.20 |
| Tpc (° C.) | 112.13 | 110.00 | 112.39 | 112.69 | 112.21 |
| Toc (° C.) | 115.23 | 113.95 | 115.18 | 115.67 | 115.55 |

The PHA blend was composed of about 58-62% homopolymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

Compounding was done in a Brabender twin screw extruder set at 180/175/170° C., at 50 RPM.

Elvaloy PTW was found to increase the G' across the range of addition, indicating branching of the polymer. Crystallization kinetics were not compromised.

Elvaloy PTW is chemically similar to poly(ethylene-co-methacrylate-co-glycidyl methacrylate) (see example above), except that the methacrylate polymer is here replaced by n-butyl acrylate.

Example 21

Effect of Ethylene Vinyl Alcohol Copolymers on Branching

Ethylene vinyl alcohol copolymers, containing 44% to 48% ethylene, are available from Eval Americas. The products Eval E 171B, Eval E 105B, Eval SP 295B and Eval SP 292B were evaluated for their potential use in increasing the melt strength of PHAs as measured by G'. They were added to a PHA blend at levels of 5, 10, and 20% by weight, as shown in the table below.

TABLE 21

PHA compositions containing ethylene vinyl alcohol copolymers, and test results.

| Ingredients (wt %) & Test Results | Form. 1 | Form. 2 | Form. 3 | Form. 4 |
|---|---|---|---|---|
| PHA Blend | 97 | 92 | 87 | 77 |
| Nucleating Masterbatch | 3 | 3 | 3 | 3 |
| Eval | 0 | 5 | 10 | 20 |
| EVAL 171B: | | | | |
| G' | 20.89 | 52.29 | 160.60 | 160.60 |
| G'/G'0 | — | 2.50 | 7.69 | 7.69 |
| Tpc (° C.) | 112.80 | 106.25 | 106.64 | 106.72 |
| Toc (° C.) | 115.46 | 109.15 | 110.49 | 111.14 |
| EVAL 105B: | | | | |
| G' | 20.89 | 75.75 | 109.10 | 180.80 |
| G'/G'0 | — | 3.63 | 5.22 | 8.65 |
| Tpc (° C.) | 112.80 | 107.28 | 107.78 | 107.53 |
| Toc (° C.) | 115.46 | 111.63 | 111.64 | 112.25 |
| EVAL SP 295B: | | | | |
| G' | 30.00 | 60.94 | 87.91 | 149.4 |
| G'/G'0 | — | 2.03 | 2.93 | 4.98 |

TABLE 21-continued

PHA compositions containing ethylene vinyl alcohol copolymers, and test results.

| Ingredients (wt %) & Test Results | Form. 1 | Form. 2 | Form. 3 | Form. 4 |
|---|---|---|---|---|
| Tpc (° C.) | 112.80 | 106.81 | 107.71 | 106.30 |
| Toc (° C.) | 115.46 | 108.29 | 110.10 | 110.88 |
| EVAL SP 292B: | | | | |
| G' | 30.00 | 48.97 | 86.78 | 133.20 |
| G'/G'0 | — | 1.63 | 2.89 | 4.44 |

The PHA blend was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

Compounding was done in a Brabender twin screw extruder set at 180/175/170° C., at 50 RPM.

At levels of only 5%, Eval E 105B produces an extremely large increase in G', and is only outperformed by poly(ethylene-co-glycidyl methacrylate). Eval E 171B also produces a good G' at 10%. However, these copolymers also slow down the crystallization of the PHA blend.

Example 22

Effect of Maleinated Polypropylene and Maleinated Polyethylene on Branching

Fusabond is another series of products from du Pont (Wilmington, Del., USA). Two of these were evaluated for their potential use in increasing melt strength of PHAs as measured by G'. Fusabond PMZ 203, which is maleinated polypropylene, and Fusabond EDM 265, which is maleinated polyethylene, were added to a PHA blend at levels of 5, 10, 15 and 20% by weight, as shown in the table below.

TABLE 22

PHA compositions Containing Maleinated Polypropylene and Maleinated Polyethylene, and Test Results.

| Ingredients (wt %) & Test Results | Form. 1 | Form. 2 | Form. 3 | Form. 4 | Form. 5 |
|---|---|---|---|---|---|
| PHA Blend | 97 | 92 | 87 | 82 | 77 |
| Nucleating Masterbatch | 3 | 3 | 3 | 3 | 3 |
| Fusabond | 0 | 5 | 10 | 15 | 20 |
| Fusabond PMZ 203: | | | | | |
| G' | 26.60 | 73.63 | 189.10 | 268.00 | 367.40 |
| G'/G'0 | — | 2.77 | 7.11 | 10.08 | 13.81 |
| Fusabond EDM 265 | | | | | |
| G' | 34.58 | 83.00 | 114.80 | 182.20 | 98.42 |
| G'/G'0 | — | 2.40 | 3.32 | 5.27 | 2.85 |

The PHA blend was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14%. The nucleating masterbatch was cyanuric acid that had been previously compounded at a rate of 33% (by weight) into a base resin of 3-hydroxybutanoic acid and 4-hydroxybutanoic acid, and pelleted.

Compounding was done in a Brabender twin screw extruder set at 180/175/170° C., at 50 RPM.

Both versions of Fusabond increased the G' of the PHA blends, even at lower levels of addition.

Example 23 and Table 23

Omitted

Example 24

Effect of Multiple Cross-Linking Agents on Peroxide Branching

In this example, the use of multiple cross-linking agents was evaluated in enhancing peroxide branching and increasing melt strength as measured by G'. Joncryl ADR-4368CS or Elvaloy PTW were added during compounding of either polyhydroxybutyrate or a PHA blend, as shown in the table below.

TABLE 24

PHA Compositions Containing Peroxide and Two Cross-linking agents, and Test Results

| Ingredients (wt %) & Test Results | Form. 1 | Form. 2 | Form. 3 | Form. 4 | Form. 5 | Form. 6 |
|---|---|---|---|---|---|---|
| Polyhydroxybutyrate | 95 | 94 | 93 | — | — | — |
| PHA Blend | — | — | — | 95 | 94 | 93 |
| Nucleating Masterbatch | 3 | 3 | 3 | 3 | 3 | 3 |
| Citroflex A4 | 1.72 | 1.72 | 1.72 | 1.72 | 1.72 | 1.72 |
| Peroxide | 0.10 | 0.10 | 0.10 | 0.10 | 0.10 | 0.10 |
| Cross-linking agent | 0.18 | 0.18 | 0.18 | 0.18 | 0.18 | 0.18 |
| Reactive Acrylic | 0 | 1 | 2 | 0 | 1 | 2 |
| Results | | | | | | |
| Joncryl ADR-4368CS: | | | | | | |
| G' 1 (1st pass) | 564 | 462 | 652 | 177 | 345 | 498 |
| G' 2 (2nd pass) | 116 | 419 | 601 | 113 | 218 | 358 |
| G' retention (G'2/G'1) | 0.21 | 0.74 | 1.07 | 0.64 | 1.23 | 2.02 |
| Elvaloy PTW: | | | | | | |
| G' 1 (1st pass) | 564 | 266 | 263 | 177 | 217 | 239 |
| G' 2 (2nd pass) | 116 | 309 | 279 | 113 | 185 | 151 |
| Total G' retention | 0.21 | 0.55 | 0.49 | 0.64 | 1.05 | 0.85 |

The polyhydroxybutyrate had a "k" of 6.1E-08, and an Mw of 803,000. The PHA blend was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. It had a "k" of 4.6E-08, and an Mw of 506,000. The nucleating masterbatch was cyanuric acid that had been previously compounded at a rate of 33% (by weight) into a base resin of 3-hydroxybutanoic acid and 4-hydroxybutanoic acid, and pelleted.

The peroxide was Triganox T117 (manufactured by Akzo Nobel). The cross-linking agent was pentaerythritol triacrylate (PE3A).

Two reactive acrylics, Joncryl ADR-4368CS (BASF) and Elvaloy PTW (du Pont), were evaluated in both the polyhydroxybutyrate and the PHA blend.

Compounding was done in a Brabender twin screw extruder set at 180/175/170° C., at 50 RPM. All ingredients were combined, and two passes through the extruder were conducted for each formulation. The two passes were intended to simulate the drop in G' frequently seen during the production of resin pellets (first pass), and subsequent conversion to finished goods (second pass). Total G' retention was calculated by dividing the G'2 for each treatment with reactive acrylics by the G'1 for the control formulation (no treatment).

In general, Joncryl ADR-4368CS performed better than Elvaloy PTW in retaining G' through two successive compounding passes. Two percent Joncryl ADR-4368CS performed better than 1%, and both had a greater effect on G' retention in the PHA blend then in polyhydroxybutyrate.

Example 25

Effect of Cross-Linking Agents on Peroxide Branching in Secondary Compounding In this example, the addition of cross-linking agents (here, reactive acrylics) during secondary compounding was evaluated for their potential use in increasing the melt strength of PHAs as measure by G'.

A formulation of PHA blend, branched with peroxide, was made. The formulation contained 95% by weight PHA blend, 3% by weight nucleating masterbatch, 1.94% by weight Citroflex A4, and 0.06% by weight peroxide.

The PHA blend was composed of about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch was cyanuric acid that had been previously compounded at a rate of 33% (by weight) into a base resin of 3-hydroxybutanoic acid and 4-hydroxybutanoic acid, and pelleted. The peroxide was Triganox 117 (manufactured by Akzo Nobel). The cross-linking agent was pentaerythritol triacrylate (PE3A). The formulation was compounded in a Brabender twin screw extruder set at 180/175/170° C., at 50 RPM. The G' of this initial formulation was 350 Pa.

This formulation was then split into two parts. One part was re-compounded under the same conditions. The second part was combined with 1% Joncryl ADR-4368CS, and the formulation was also re-compounded under the same conditions. The G' of each formulation after the second compounding run was measured, and the results are shown in the table below.

TABLE 25

Results of Second Compounding Run With or Without Reactive Acrylic.

| | No Reactive Acrylic | Reactive Acrylic |
|---|---|---|
| G'1 (first pass; no reactive acrylic) | 350 | 350 |
| G'2 (second pass; without or with reactive acrylic) | 95 | 115.9 |
| G'2/G'1 | 0.27 | 0.33 |
| Improvement Factor (G'2/G'1 of Control/treatment) | — | 1.22 |

As seen from the above data, addition of reactive acrylic improved the G' by a factor of 1.22.

A similar experiment was then performed comparing Joncryl ADR-4368CS with Elvaloy PTW.

A formulation of PHA blend, branched with peroxide, was made. The formulation contained 95% by weight PHA blend, 3% by weight nucleating masterbatch, 1.72% by weight Citroflex A4, 0.10% by weight peroxide, and 0.18% by weight cross-linking agent.

The PHA blend was composed of about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch was cyanuric acid that had been previously compounded at a rate of 33% (by weight) into a base resin of 3-hydroxybutanoic acid and 4-hydroxybutanoic acid, and pelleted. The peroxide was Triganox 117 (manufactured by Akzo Nobel). The cross-linking agent was pentaerythritol triacrylate (PE3A). The formulation was compounded in a Brabender twin screw extruder set at 180/175/170° C., at 50 RPM.

The G' of this initial formulation was 209 Pa.

This formulation was then split into three parts. One part was re-compounded under the same conditions. The second part was combined with 1% Joncryl ADR-4368CS, and the formulation was also re-compounded under the same conditions. The third part was combined with 5% Elvaloy PTW, and re-compounded under the same conditions. The G' of each formulation after the second compounding run was measured, and the results are shown in the table below.

TABLE 26

Results of Second Compounding Run With or Without Two Different Reactive Acrylics.

| | No Reactive Acrylic | With Joncryl ADR-4368CS | With Elvaloy PTW |
|---|---|---|---|
| G'1 (first pass; no reactive acrylic) | 209 | 209 | 209 |
| G'2 (second pass; without or with reactive acrylic) | 67 | 119.26 | 111.22 |
| G'2/G'1 | 0.32 | 0.57 | 0.53 |
| Improvement Factor (G'2/G'1 of Control/treatment) | — | 1.78 | 1.66 |

As seen from the above data, addition of either reactive acrylic improved the G', but Joncryl ADR-4368CS improved it to a greater degree than the Elvaloy PTW.

Another formulation was made with a different PHA blend. The formulation contained 95% by weight PHA blend, 3% by weight nucleating masterbatch, 1.8% by weight Citroflex A4, and 0.20% by weight peroxide. The PHA blend was composed of about 18-22% homo-polymer of 3-hydroxybutanoic acid, and about 78-82% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted. The peroxide was Triganox 117 (manufactured by Akzo Nobel). The formulation was compounded on a Leistritz MAXX 27 mm twin screw extruder at the temperatures (feed zone to die) 175/175/175/175/170/170/170/170/170/180/180° C. at 100 rpm.

The G' of this initial formulation was 410 Pa.

This formulation was then split into two parts. One part was re-compounded under the same conditions. The second part was combined with 1% Joncryl ADR-4368CS, and the formulation was also re-compounded under the same conditions. The G' of each formulation after the second compounding run was measured, and the results are shown in the table below.

TABLE 27

Results of second compounding run with or without reactive acrylic.

|  | No Reactive Acrylic | Reactive Acrylic |
|---|---|---|
| G'1 (first pass; no reactive acrylic) | 410.00 | 410.00 |
| G'2 (second pass; without or with reactive acrylic) | 335.00 | 492.45 |
| G'2/G'1 | 0.82 | 1.20 |
| Improvement Factor (G'2/G'1 of Control/treatment) | — | 1.46 |

As seen from the above data, addition of reactive acrylic improved the G' by a factor of 1.46.

Example 26

Effect of Reactive Acrylics on Branching

Reactive acrylics are available from a variety of suppliers. In this example, SC64053, SC64055 and SC64056 (from Omnova Solutions, Inc., Fairlawn, Ohio, USA) were evaluated for their potential use in increasing the melt strength of PHAs as measured by G'. To compare them to Joncryl ADR-4368CS, they were added to a PHA blend at levels of 5% by weight, as shown in the table below.

TABLE 28

PHA Compositions Containing Reactive Acrylics, and Test Results

| Ingredients (wt %) & Test Results | Form. 1 | Form. 2 | Form. 3 | Form. 4 | Form. 5 |
|---|---|---|---|---|---|
| PHA Blend | 97 | 92 | 92 | 92 | 92 |
| Nucleating Masterbatch | 3 | 3 | 3 | 3 | 3 |
| SC64053 | — | 5 | — | — | — |
| SC64055 | — | — | 5 | — | — |
| SC64056 | — | — | — | 5 | — |
| Joncryl ADR-4368CS | — | — | — | — | 5 |
| Tm (° C.) | 192 | 190 | 191 | 196-189 | 197 |
| Pressure (melt) (psi) | 1440 | 1309 | 1270 | 1270 | — |
| Die swell (%, 180 C.) | 118 | 124 | 122 | 123 | 126 |
| Melt Viscosity | 2163 | 2457 | 2162 | 2198 | 2743 |
| MCS | −0.0712 | −0.1252 | −0.0600 | −0.1047 | −0.0105 |
| G' | 104.5 | 87.2 | 60.3 | 70 | 380 |
| G'/G'0 | — | 0.83 | 0.58 | 0.67 | 3.64 |

The PHA blend was composed of about 58-62% homopolymer of 3-hydroxybutanoic acid, and about 38-42% copolymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

SC64053, SC64055, SC64056 and Joncryl ADR-4368CS were added to the various formulations at a level of 5% (wt %), and compounded on a Leistritz MAXX 27 mm twin screw extruder at the temperatures (feed zone to die) 175-175-175-175-170-170-170-170-170-180-180° C. at 100 rpm. The melt temperature (Tm, ° C.) and the melt pressure (in psi) were measured. The melt viscosity was also measured as described above (see, "Measurement of Thermal Stability"), at a dwell time of 3 minutes at 180° C. The MCS (melt capillary stability) was also measured.

SC64053, SC64055, SC64056 reactive acrylics failed to increase the G' of their respective formulations. Only Joncryl ADR-4368CS did so.

Example 27

Omitted

Example 28

Effect of Reactive Acrylics on Peroxide Branching

Experiments were done on the reactive acrylics SC64053, SC64055 and SC64056 (from Omnova Solutions, Inc., Fairlawn, Ohio, USA), and their ability to enhance peroxide branching and increasing the melt strength as measured by G'.

A base formulation was made, which contained 95% (by weight) PHA blend, 3% (by weight) nucleating masterbatch, 1.72% (by weight) Citroflex A4, 0.10% peroxide, and 0.18% (by weight) cross-linking agent.

The PHA blend was composed of about 58-62% homopolymer of 3-hydroxybutanoic acid, and about 38-42% copolymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted. The peroxide was Triganox 117 (manufactured by Akzo Nobel). The cross-linking agent was pentaerythritol triacrylate (PE3A). The formulation was compounded in a Brabender twin screw extruder set at 180/175/170° C., at 50 RPM.

During compounding, the base formulation exhibited die swell of 154% (at 180 C). The melt viscosity (at a dwell time of 3 minutes at 180° C.) was 1596, and the MCS (melt capillary stability) was −0.0998. The G' of this base formulation was 339 Pa.

Four reactive acrylic formulations were also made. Each of these contained 92% (by weight) of the same PHA blend, 3% (by weight) of the same nucleating masterbatch, and 5% (by weight) of a reactive acrylic. The reactive acrylics were Joncryl ADR-4368CS, SC64053, SC64055 and SC64056.

Three parts of the base formulation were then combined with 2 parts of each of four different reactive acrylic formulations. The four different mixtures were then compounded in a Brabender twin screw extruder set at 180/175/170° C., at 50 RPM. This produced Formulations 2-5, shown in the table below. The base formulation is provided as Formulation 1 for reference.

TABLE 29

PHA Compositions Containing Four Different Reactive Acrylics, and Test Results

| Ingredients (wt %) and Test Results | Form. 1 | Form. 2 | Form. 3 | Form. 4 | Form. 5 |
|---|---|---|---|---|---|
| PHA Blend | 95 | 93.8 | 93.8 | 93.8 | 93.8 |
| Nucleating Masterbatch | 3 | 3 | 3 | 3 | 3 |
| Citroflex A4 | 1.72 | 1.032 | 1.032 | 1.032 | 1.032 |
| Peroxide | 0.10 | 0.06 | 0.06 | 0.06 | 0.06 |
| Cross-linking agent | 0.18 | 0.108 | 0.108 | 0.108 | 0.108 |
| SC64053 | — | 2.0 | — | — | — |
| SC64055 | — | — | 2.0 | — | — |
| SC64056 | — | — | — | 2.0 | — |
| Joncryl ADR-4368CS | — | — | — | — | 2.0 |
| Die swell (%, 180 C.) | 154 | 154 | 153 | 154 | 153 |
| Melt Viscosity | 1596 | 1924 | 1750 | 1967 | 2104 |
| MCS | −0.0998 | −0.1041 | −0.0337 | −0.0987 | −0.0828 |
| G' | 339.0 | 179.5 | 193.0 | 176.0 | 410.0 |
| G'/G'0 | — | 0.53 | 0.57 | 0.52 | 1.21 |

Joncryl ADR-4368CS was seem to produce the highest increase in G', relative to the Omnova reactive acrylics. It should also be noted that Joncryl ADR-4368CS is provided as a solid, while the Omnova reactive acrylics are sold as 50% acrylic emulsions in water.

Example 28

Effect of Styrene Glycidyl Methacrylate on Branching

In this example, the styrenic acrylic Joncryl ADR-4368 (styrene glycidyl methacrylate) (BASF), was evaluated for its ability to increase the effective molecular weight of different PHA blends as measured by G'. Three different formulations containing different amounts of Joncryl ADR-4368, each with a different PHA blend, are shown in the table below.

TABLE 30

PHA formulations Containing Styrene Glycidyl Methacrylate, and Test Results.

| Ingredients (wt %) & Test Results | Formulation 1 | Formulation 2 | Formulation 3 |
|---|---|---|---|
| PHA Blend | PHA Blend 1 | PHA Blend 2 | PHA Blend 3 |
| k PHA Blend | 4.1E−08 | not measured | 6.4E−08 |
| Mw PHA Blend | 578,000 | not measured | 727,000 |
| Amount of PHA Blend (wt %) | 92% | 92% | 92% |
| Nucleating Masterbatch | 3% | 3% | 3% |
| Joncryl ADR-4368 | 5% | 5% | 5% |
| Equipment/Screw | Leistritz #16 | Leistritz #13 | Leistritz #16 |
| Tm (° C.) during compounding | 200 | 204 | 194 |
| G'/G'0 | 2.6 | 11.2 | 2.9 |
| % increase in Mw | not measured | 13 | not measured |
| % increase Mn | not measured | 10 | not measured |
| % increase Mw abs | not measured | not measured | 8 |
| k (control formulation) | 1.10E−07 | not measured | 7.5E−08 |
| k | 7.80E−08 | not measured | 3.70E−08 |
| Tpc (° C.) | 112.4 | 105 | 95.6 |
| Change in Tpc (° C.) | −4.4 | −8.1 | −13.3 |
| Toc (° C.) | 115.8 | 107.2 | 100.1 |
| Change in Toc (° C.) | −5 | −8.7 | −12.8 |

"PHA Blend 1" was pure poly(3-hydroxybutyrate). "PHA Blend 2" was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. "PHA Blend 3" was composed of about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent.

The nucleating masterbatch was cyanuric acid that had been previously compounded at a rate of 33% (by weight) into a base resin of 3-hydroxybutanoic acid and 4-hydroxybutanoic acid, and pelleted.

Compounding was done on a Leistritz TSE extruder operating at 175/175/175/175/170/170/170/170/180/180/180° C., 100 RPM, at 60 lbs/hour.

Three control formulations, corresponding to the above three formulations, but containing no Joncryl, 97% PHA blend and 3% nucleating masterbatch, were also compounded in the same way, and used as measurement controls.

G'/G'0 was calculated by dividing the G' of each formulation in the table above by the G' of its corresponding control formulation (G'0). Likewise, the percent increase in Mw and Mn were calculated as the increase in the experimental formulation in the table above, relative to the Mw and Mn of the corresponding control formulation. Absolute molecular weight was measured by FIPA.

These results show that the improvement in G' was about the same when Joncryl was added to PHA Blends 1 and 3. PHA Blend 3 showed a marked improvement in G', possibly due to better activation of carboxylic acid end groups at the higher Tm.

The temperature of peak crystallization (Tpc) and temperature of onset of crystallization (Toc) also decreased for each of the three formulations.

Additional formulations of PHA Blend 2 were then made, to examine the effects of lower amounts of Joncryl. Formulations made are listed in the table below.

TABLE 31

PHA Formulations Containing Styrene Glycidyl Methacrylate and Test Results.

| Ingredients (wt %) and Test Results | 2a | 2b | 2c | 2 | 2d | 2e | 2f | 2g |
|---|---|---|---|---|---|---|---|---|
| PHA Blend | 97% | 96% | 95% | 92% | 97% | 96.5% | 96% | 95% |
| Joncryl ADR-4368 | 0% | 1% | 2% | 5% | 0% | 0.5% | 1% | 2% |

TABLE 31-continued

PHA Formulations Containing Styrene Glycidyl Methacrylate and Test Results.

| Ingredients (wt %) and Test Results | 2a | 2b | 2c | 2 | 2d | 2e | 2f | 2g |
|---|---|---|---|---|---|---|---|---|
| Nucleant Masterbatch | 3% | 3% | 3% | 3% | 3% | 3% | 3% | 3% |
| Tm (° C.) during compounding | 206 | 204-207 | 207 | 204 | | | | |
| G'/G'0 | 1 | 2.0 | 2.8 | 11.2 | 1 | 1.3 | 1.7 | 2.8 |
| % increase in Mw | — | 0.8 | 8 | 13 | — | −2.28 | −0.76 | 12.91 |
| % increase Mn | — | −3.4 | 5.4 | 10 | — | 2.71 | −0.65 | 11.54 |

Formulation 2 in this table is the same as that in the previous table. The PHA blend was composed of about 60% homopolymer of 3-hydroxybutanoic acid, and about 40% co-polymer of 3-hydroxybutanoic acid and 4-hydroxybutanoic acid, where the 4-hydroxybutanoic acid is approximately 10-12%. Two different batches of this blend were used. Formulation 2, 2a, 2b, and 2c were all made from the same batch of PHA blend. A different batch (but having the same composition) was used to make Formulations 2d-2g.

The batch of PHA blend used in Formulations 2, 2a, 2b and 2c had a k of 5.8E-08. The k was not measured for the batch used in Formulations 2d, 2e, 2f, and 2g.

The nucleating masterbatch was cyanuric acid that had been previously compounded at a rate of 33% (by weight) into a base resin of 3-hydroxybutanoic acid and 4-hydroxybutanoic acid, and pelleted.

Compounding of Formulations 2a, 2b, 2c and 2 was done on a Leistritz TSE extruder operating at 175/175/175/175/170/170/170/170/180/180/180° C., 100 RPM, at 60 lbs/hour. Formulations 2d, 2e, 2f, and 2g were compounded on a Brabender extruder operating at 180/175/170° C., 50 RPM.

Formulations 2a and 2d (no Joncryl added) served as controls for experimental Formulations 2b, 2c and 2 and 2e, 2f and 2g, respectively. G'/G'0 was calculated by dividing the G' of the experimental formulations by their corresponding control formulation. Likewise, the percent increase in Mw and Mn were calculated as the increase in the experimental formulations in the table above, relative to the Mw and Mn of the corresponding control formulations.

These results show that Joncryl consistently improves the G' and Mw of PHA blends. The improvement is especially marked at higher concentrations, and is independent of compounding machinery.

Example 29, 30 and 31

Omitted

Example 32

Effect of Co-Agent on Peroxide Branching of Polyhydroxybutyrate

In this example, the use of pentaerythritol triacrylate was evaluated as a co-agent in enhancing peroxide branching and increasing the melt strength of polyhydroxybutyrate as measured by G'. It was combined with the peroxide Triganox 117 during compounding of polyhydroxybutyrate, as shown in the table below.

TABLE 32

PHB Compositions Containing Peroxide and Co-Agent, and Test Results

| Ingredients (wt %) & Test Results | Formulation 1 | Formulation 2 |
|---|---|---|
| PHB | 90 | 77 |
| Citroflex A4 | 10 | 19.72 |
| Nucleating Masterbatch | — | 3 |
| Peroxide | — | 0.1 |
| Co-agent | — | 0.18 |
| Screw | Leistritz 12 | Leistritz 16 |
| Tm, ° C. | 182-183 | 186-192 |
| Tpc, ° C. | 93.5 | 112.2 |
| Toc, ° C. | 102.2 | 116.3 |
| G' | 21.06 | 236 |
| G'/G'0 | — | 11.21 |
| Melt visc., 180° C., 5 min. | 792 | 684 |
| Melt visc., 180° C., 10 min. | 410 | 403 |
| MCS | −0.1317 | −0.106 |

The PHB was homopolymer of poly(3-hydroxybutyrate). The PHB used in control Formulation 1 had a starting weight-average molecular weight (Mw) of 587 kg/mol, and a kd (thermal stability via DSC measurement) of 9.2E-08. The PHB used in Formulation 2 had a starting weight-average molecular weight (Mw) of 803 kg/mol, and a kd (thermal stability via DSC measurement) of 4.62E-08. The nucleating agent was cyanuric acid that had been previously compounded at a rate of 33% (by weight) into a base resin of 3-hydroxybutanoic acid and 4-hydroxybutanoic acid, and pelleted. The peroxide was Triganox 117, manufactured by Azko Nobel. The co-agent was pentaerythritol triacrylate.

The formulation was compounded on a Leistritz MAXX 27 mm twin screw extruder at the temperatures (feed zone to die) 175/175/175/175/170/170/170/170/170/180/180° C. at 100 rpm.

The branched PHB (Formulation 2) exhibited faster crystallization, higher melt strength (G'), and better rheological properties.

Example 33

Effect of Epoxide-Functional Compounds on Polyhydroxyalkanoate Branching

In this example, Joncryl ADR-4368CS was evaluated for its ability to increase of effective molecular weight as measured by G'. The compositions and test results are presented in the table below. Table 33. PHA Compositions Containing an Epoxide-Functional Compound, and Test Results

| Ingredients (wt %) & Test Results | Formulation 1 (control) | Formulation 2 | Formulation 3 |
|---|---|---|---|
| PHA Blend | 87% | 85% | 82% |
| Joncryl ADR-4368CS | 0% | 2% | 5% |
| Citroflex 4 | 10% | 10% | 10% |
| Nucleating Masterbatch | 3% | 3% | 3% |
| Tm ° C. | 206 | 207 | 204 |
| G'/G' 0 | — | 2.8 | 11.2 |
| Mw, % increase | — | 8 | 13 |
| Mn, % increase | — | 5.4 | 10 |

-continued

| Ingredients (wt %) & Test Results | Formulation 1 (control) | Formulation 2 | Formulation 3 |
|---|---|---|---|
| Melt visc., 180° C., 5 min. | 1395 | 1449 | |
| Melt visc., 180° C., 10 min. | 933 | 1524 | |

The PHA blend was composed of about 58-62% homopolymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

The formulations in the table above were compounded on a Leistritz TSE extruder operating at 175/175/175/175/170/170/170/170/180/180/180° C., 100 RPM, at 60 lbs/hour.

The addition of Joncryl ADR-4368CS was found to increase the melt strength of the polymer, and build up the effective molecular weight of the polymer.

Example 33

Effect of Epoxide-Functional Compounds on Polyhydroxyalkanoate Branching

In this example, Joncryl ADR-4368CS was evaluated for its ability to increase of effective molecular weight as measured by G'. The compositions and test results are presented in the table below.

TABLE 34

PHA Compositions Containing an Epoxide-Functional Compound, and Test Results

| Ingredients (wt %) & Test Results | Formulation 1 (control) | Formulation 2 | Formulation 3 |
|---|---|---|---|
| PHA Blend | 87% | 85% | 82% |
| Joncryl ADR-4368CS | 0% | 2% | 5% |
| Citroflex 4 | 10% | 10% | 10% |
| Nucleating Masterbatch | 3% | 3% | 3% |
| Tm ° C. | 206 | 207 | 204 |
| G'/G' 0 | — | 2.8 | 11.2 |
| Mw, % increase | — | 8 | 13 |
| Mn, % increase | — | 5.4 | 10 |
| Melt visc., 180° C., 5 min. | 1395 | 1449 | |
| Melt visc., 180° C., 10 min. | 933 | 1524 | |

The PHA blend was composed of about 58-62% homopolymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

The formulations in the table above were compounded on a Leistritz TSE extruder operating at 175/175/175/175/170/170/170/170/180/180/180° C., 100 RPM, at 60 lbs/hour.

The addition of Joncryl ADR-4368CS was found to increase the melt strength of the polymer, and build up the effective molecular weight of the polymer.

Example 33

Effect of Peroxide on Branching of Polyhydroxyalkanoate

In this example, the peroxide Triganox 131 was evaluated for its ability to increase of effective molecular weight as measured by G'. The compositions and test results are presented in the table below.

TABLE 35

PHA Composition Containing a Peroxide, and Test Results

| Ingredient (wt %) | Formulation 1 | Formulation 2 |
|---|---|---|
| PHA Blend | 92 | 92 |
| Nucleating Masterbatch | 3 | 3 |
| Slip/Anti-block Masterbatch | 3 | 3 |
| Citroflex A4 | 2 | 1.9 |
| Peroxide | 0 | 0.1 |
| Tg | −16.63 | −15.95 |
| Tpc, ° C. | 106.7 | 106.5 |
| Toc, ° C. | 109.4 | 109.4 |
| % crystallinity | 28.9 | 28.9 |
| G' | 115.8 | 174.7 |
| G'/G' 0 | — | 1.51 |

The PHA blend was composed of about 34-38% homopolymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch was cyanuric acid that had been previously compounded at a rate of 33% (by weight) into a base resin of 3-hydroxybutanoic acid and 4-hydroxybutanoic acid, and pelleted. The slip anti-block masterbatch was a mixture of erucamide (20% by weight) diatomaceous earth (15% by weight) nucleant masterbatch (3% by weight), pelleted into PHA (62% by weight). The peroxide was Triganox 131 (manufactured by Akzo Nobel). The addition of the peroxide Triganox 131 improved the G' of the polymer.

Example 34

Effect of Various Joncryl Products on Polyhydroxyalkanoate Branching

In this example, various Joncryl products from BASF were evaluated for their ability to increase of effective molecular weight as measured by G'. Technical information about the compounds is provided below.

TABLE 36

Technical Characteristics of Joncryl Compounds

| Compound | Functionality | Mw (g/mol) | Tg | Form |
|---|---|---|---|---|
| Joncryl ADP-1230 | none (polybutyl acrylate) | 190,000 | −65 | Liquid |
| Joncryl ADP-3250 | carboxyl | 3,200 | −44 | Liquid |
| Joncryl ADR-4300-S | epoxy | 6,800 | 55 | Powder |
| Joncryl ADR-3229 | anhydride | 4,000 | 58 | Powder |
| Joncryl ADR-4368CS | epoxy | 6,800 | | Powder |

The compositions and test results are presented in the table below.

TABLE 37

PHA Compositions Containing Various Joncryl Products, and Test Results

| Ingredients (wt %) & Test Results | Form. 1 | Form. 2 | Form. 3 | Form. 4 | Form. 5 | Form. 6 |
|---|---|---|---|---|---|---|
| PHA Blend | 97 | 92 | 92 | 92 | 92 | 92 |
| Nucleating Masterbatch | 3 | 3 | 3 | 3 | 3 | 3 |
| Joncryl ADP-1230 | | 5 | | | | |
| Joncryl ADP-3250 | | | 5 | | | |
| Joncryl ADR-4300-S | | | | 5 | | |
| Joncryl ADR-3229 | | | | | 5 | |
| Joncryl ADR-4368CS | | | | | | 5 |
| Melt visc., 180° C., 5 min. | 2031 | 397 | 276 | 2029 | 1627 | 2227 |
| Melt visc., 180° C., 10 min. | 1810 | 273 | 199 | 1666 | 1256 | 1894 |
| MCS | −0.0230 | −0.0749 | −0.0662 | −0.0394 | −0.0517 | −0.0324 |
| G' | 68 | 88 | 106 | 97 | 55 | 190 |
| G'/G' 0 | — | 1.29 | 1.56 | 1.43 | 0.81 | 2.79 |

In the table above, the PHA blend was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

The formulation was compounded on a Leistritz MAXX 27 mm twin screw extruder at the temperatures (feed zone to die) 175/175/175/175/170/170/170/170/170/180/180° C. at 100 rpm.

As shown by the data above, all but Joncryl ADR-3229 were found to increase the melt strength of the polymer, and build up the effective molecular weight of the polymer. However, Joncryl ADR-4368CS performed the best in this regard.

Example 35

Production of PHA Cast Film and Test of Annealing Times and Temperatures

In this example, heat treatment at above-ambient temperatures produced a remarkable improvement in puncture toughness of PHA films.

Cast films were made from the following composition:

TABLE 38

Composition of PHA Polymer Cast Films

| Component | Weight Percent |
|---|---|
| PHA Blend | 87.4 |
| Citroflex A4 (plasticizer) | 4.6 |
| Nucleating Masterbatch | 3.0 |
| Slip/Antiblock Masterbatch | 5.0 |

The PHA blend was composed of about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch was cyanuric acid that had been previously compounded at a rate of 33% (by weight) into a base resin of 3-hydroxybutanoic acid and 4-hydroxybutanoic acid, and pelleted. The composition of the slip/antiblock was 15 wt % Eracamide (Cradamide ER from Croda Universal) and 15 wt % silica (Sylobloc 45 from WR Grace), compounded into the same PHA blend.

The above polymer composition was pelletized using a 27 mm MAXX Leistritz twin-screw extruder using the following temperature profile: 175/175/170/170/170/165/165/165/160/160 (° C.). The extruder was run at 55 lbs/hr rate and 150 rpm with a melt temperature of about 195° C. and a melt pressure of about 1900 psi. The above pellets were dried and converted into film (extrusion cast film) using a lab-scale RandCastle film extruder. The temperature settings on the ¾-inch RandCastle extruder used was 175/170/165/165 (° C.) and the extruder was run at about 40 rpm to produce film at about 3 mils thickness. The film was extruded through a coat-hanger die with a 20 mils die gap onto a chrome-plated roll that was heated to about 55° C.

The films were then tested. The Elmendorf resistance to tear propagation (MD Tear Resistance and TD Tear Resistance) was measured according to ASTM D1922-06. The dart impact strength was measured according to ASTM D1709-04. The tensile properties were measured according to ASTM D882-02, and included break stress (MD Break Stress and TD Break Stress) and tensile elongation (MD Tensile Elongation, and TD Tensile Elongation).

The films were annealed at 80° C., 100° C. and at 120° C. for varying periods of time, and the dart impact strength was tested. The results are shown in the table below.

TABLE 39

Dart Impact Strength (In Grams) for Films Annealed at Various Temperatures for Various Periods of Time

| Annealing Time (min) | Annealing at 60° C. | Annealing at 80° C. | Annealing at 100° C. | Annealing at 120° C. |
|---|---|---|---|---|
| 0 | 97.5 | 97.5 | 97.5 | 97.5 |
| 5 | 123 | 172.5 | 184.5 | 244.5 |
| 30 | 100.5 | 154.5 | 174 | 322.5 |
| 60 | 106.3 | 222 | 198 | 316.5 |
| 120 | 85.5 | 211.5 | 222 | 342 |

A two-fold increase in dart impact strength is noted at 80° C. and at 100° C., while a 3-fold increase is evident for films annealed at 120° C. The observed increases in film toughness are noteworthy and not completely expected. The considerable improvements observed even over the very short annealing times at the higher temperatures makes this approach a reasonable one to practice on a commercial basis.

Annealing time of one hour was chosen for additional annealing tests. Annealing was done for one hour at 60° C., 80° C., 100° C. and at 120° C., and the affect of annealing temperature on dart impact strength in grams, tear resistance in g/mil, and break stress in MPa was measured. Tensile elongation at break (%) was also measured. The results are shown in the table below. The 25° C. data point represents the properties for untreated (unannealed) film.

TABLE 40

Effect on Film Properties of One Hour Annealing at Various Temperatures

| Annealing Temp. (° C., 1 hour) | 25 | 60 | 80 | 100 | 120 |
|---|---|---|---|---|---|
| MD Tear Resistance (g/mil) | 11.7 | 12.7 | 14.5 | 22.5 | 36.9 |
| TD Tear Resistance (g/mil) | 16.2 | 18.0 | 21.5 | 33.3 | 55.5 |
| MD Break Stress (MPa) | 25.0 | 28.2 | 27.1 | 27.5 | 27.6 |
| TD Break Stress (MPa) | 19.0 | 18.0 | 17.8 | 23.1 | 26.2 |
| Dart Impact Strength (grams) | 97.5 | 106.3 | 222.0 | 198.0 | 316.5 |
| MD Tensile Elongation (%) | 697 ± 82 | 751 ± 41 | 734 ± 43 | 703 ± 10 | 631 ± 71 |
| TD Tensile Elongation (%) | 615 ± 144 | 565 ± 157 | 621 ± 120 | 660 ± 92 | 631 ± 54 |

Mechanical strength of the film was measured in two directions, along the flow exiting the die ("machine direction" tear or break or "MD Tear" or "MD Break") and also perpendicular to the polymer flow exiting the die ("transverse direction" tear or break or "TD Tear" or "TD Break"). Tear resistance in both directions increased with increasing annealing temperature. Break stress along MD rose very slightly with increasing annealing temperature, but break stress along TD increased enormously for annealing temperatures of 100° C.-120° C. Dart impact strength generally increased with increasing annealing temperature.

These data show that annealing of polyhydroxyalkanoate films produces remarkable improvement in dart impact strength tear resistance, and break stress. Treatment at 120° C. was especially beneficial. However, no improvement was seen for elongation to break parameters, as shown in the table above.

Example 36

Production of Branched PHA Cast Film and Test of Annealed vs. Untreated Film

This example examines the effect of annealing on films made from branched polymers. Film was made with the following formulation.

TABLE 41

Composition of Cast Films of Branched PHA Polymer

| Component | Weight % |
|---|---|
| PHA Blend | 86.5 |
| Citroflex A4 (plasticizer) | 7.4 |
| Nucleating Masterbatch | 3.0 |
| Slip/Antiblock Masterbatch | 3.0 |
| Peroxide (tert-butylperoxy 2-ethylhexyl carbonate) (Trig 117; from Akzo Nobel) | 0.1 |

The PHA blend was composed of about 34-38% homopolymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch was cyanuric acid that had been previously compounded at a rate of 33% (by weight) into a base resin of 3-hydroxybutanoic acid and 4-hydroxybutanoic acid, and pelleted. The slip anti-block masterbatch was a mixture of erucamide (20% by weight) diatomaceous earth (15% by weight) nucleant masterbatch (3% by weight), pelleted into PHA (62% by weight).

The formulation above was compounded on a 27 mm MAXX Leistritz twin-screw extruder, with the temperatures on the extruder zones set at: 175/175/170/170/170/165/165/165/160/160° C. The process data was as follows:

TABLE 42

Process Data for Compounding of Pellets

| Process Data | |
|---|---|
| Rate (lbs/hr) | 75 |
| Screw RPM | 150 |
| Melt Temp (° C.) | 177 |
| Melt Pressure (psi) | 1867 |
| S-drive Torque (%) | 27 |
| Weight-average molecular weight (compounded pellets) | ~454 kg/mol |

The compounded resin pellets were converted into cast film on a Killion 1.25 inch extruder using the following temperature profile: Extruder: 175/170/165/160° C.; Die: 165° C. The extruder was operated at about 56 rpm with a melt temp of about 181° C. The die gap was about 20 mils. The film was gathered at about 15.5 feet/min.

Samples of the film were annealed for one hour at 120° C., and the properties of the as-made (i.e., un-annealed) film and annealed film were measured. The results are shown in the table below.

TABLE 43

Properties of Annealed and Un-Annealed Branched Film

| Film Property Data | As-Made Film | Annealed Film |
|---|---|---|
| MD Tear resistance (g/mil) | 13 | 847 |
| TD Tear resistance (g/mil) | 29 | 662 |
| Dart impact Strength (g/mil) | 5 | 84 |
| MD Tensile Elongation (%) | 670 | 543 |
| TD Tensile Elongation (%) | 687 | 552 |

The remarkable improvements in film properties, as a result of the annealing history, is evident from the data above. Both MD and TD tear resistance increased a surprising degree, as did impact strength. Tensile elongation was reduced, but only slightly.

Example 37

Production of Branched PHA Cast Film

This example examines the effect of calcium carbonate on annealed and as-made films made from branched polymers. Film was made with the following formulation:

TABLE 44

Composition of Cast Films of Branched PHA Polymer

| Component | Weight % |
| --- | --- |
| PHA Blend | 76.00 |
| Citroflex A4 (plasticizer) | 7.85 |
| Nucleating Masterbatch | 3.00 |
| Slip/Antiblock Masterbatch | 3.00 |
| Peroxide (tert-butylperoxy 2-ethylhexyl carbonate) (Trig 117; from Akzo Nobel) | 0.15 |
| Ground Calcium Carbonate, avg particle size ~3 microns (Omya 3-FL) | 10.00 |

The PHA blend was composed of about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch was cyanuric acid that had been previously compounded at a rate of 33% (by weight) into a base resin of 3-hydroxybutanoic acid and 4-hydroxybutanoic acid, and pelleted. The slip anti-block masterbatch was a mixture of erucamide (20% by weight) diatomaceous earth (15% by weight) nucleant masterbatch (3% by weight), pelleted into PHA (62% by weight).

The above formulation was compounded on a 27 mm MAXX Leistritz twin-screw extruder, with the temperatures on the extruder zones set at: 175/175/170/170/170/165/165/165/160/160° C. The process data was as follows:

TABLE 45

Process Data for Compounding of Pellets

| Process Data | |
| --- | --- |
| Rate (lbs/hr) | 85 |
| Screw RPM | 130 |
| Melt Temp (° C.) | 188 |
| Melt Pressure (psi) | 2007 |
| S-drive Torque (%) | 43 |
| Weight-average molecular weight (compounded pellets) | ~471 kg/mol |

The compounded resin pellets were converted into cast film on a Killion 1.25 inch extruder using the following temperature profile: Extruder: 175/170/165/160° C.; Die: 165° C. The extruder was operated at about 56 rpm with a melt temp of about 181° C. The die gap was about 20 mils. The film was gathered at about 19.0 feet/min.

Samples of the film were annealed for one hour at 120° C., and the properties of the as-made (i.e., un-annealed) film and annealed film were measured. The results are shown in the table below.

TABLE 46

Properties of Annealed and Un-Annealed Branched Film

| Film Property Data | As-Made Film | Annealed Film |
| --- | --- | --- |
| MD Tear resistance (g/mil) | 17 | 693 |
| TD Tear resistance (g/mil) | 19 | 667 |
| Dart impact Strength (g/mil) | 6 | 83 |
| MD Tensile Elongation (%) | 634 | 457 |
| TD Tensile Elongation (%) | 458 | 450 |

The remarkable improvements in film properties, as a result of the annealing history, is evident from the data above. Annealing of the branched film produced enormous and surprising increases in MD and TD tear resistance, and also in impact strength. Tensile elongation was slightly reduced by annealing, however.

Example 38

Effect of Annealing on Polyethylene (PE) Film

In this example, the effect of annealing on polyethylene film was examined.

A low density polyethylene (LDPE) (density~0.920 g/cc; melt index~2.5) was used in this example. This LDPE was converted into cast film using a ¾ inch RandCastle extruder fitted with a coat-hanger cast die. The extruder was operated at about 40 rpm with all extruder and die zones set to about 190° C. The primary casting roll was chilled with house water.

Once the film was made, it was annealed and tested as for the PHA films in the examples above. The results are shown in the table below.

TABLE 47

Properties of Annealed and Un-Annealed Polyethylene Films

| Annealing Treatment | Dart Impact (grams) | MD Tear (g/mil) | TD Tear (g/mil) |
| --- | --- | --- | --- |
| As-Made PE Film (no annealing) | 241.5 | 196.7 | 218.2 |
| Film annealed at 80° C. for 30 min. | 214.5 | | |
| Film annealed at 80° C. for 60 min. | 205.5 | 214.3 | 225.2 |
| Film annealed at 100° C. for 60 min. | 195.0 | | |

As shown above, LDPE film shows no appreciable improvements in impact strength or tear resistance upon being annealed.

Example 39

Effect of Annealing on Polyhydroxyalkanoate Injection Moldings

In this example, the effect of annealing on injection molded parts was evaluated. The formulation used for injection molding (Formulation 1) was as follows: 19.4% by weight PHA Blend 1, 58.1% by weight PHA Blend 2, 2.4% by weight Nucleating Masterbatch, 19.4% by weight FlexTalc 1222, and 0.8% by weight Acrawax C. PHA Blend 1 composed of about 18-22% homo-polymer of 3-hydroxybutanoic acid, and about 78-82% co-polymer of 3-hydroxybutanoic acid and 4-hydroxybutanoic acid, where the 4-hydroxybutanoic acid is approximately 8-14% weight percent. PHA Blend 2 composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch was cyanuric acid that had been previously compounded at a rate of 33% (by weight) into a base resin of 3-hydroxybutanoic acid and 4-hydroxybutanoic acid, and pelleted.

The formulation was compounded on a Leistritz MAXX 27 mm twin screw extruder at the temperatures (hopper to die) 175/175/175/175/175/170/170/170/170/170/170° C. at 100 rpm and 40 lbs/hr. Injection molding was carried out on a Roboshot with a barrel volume to shot size of about 2, where the melt temperature was controlled at about 170° C. by adjusting the barrel temperature setting and screw rpm. A standard ASTM mold with both tensile bar and izod bar was used. Flash was addressed by packing the mold at 50% of the peak injection pressure.

The injection molded bars were then annealed by incubation in an oven at the temperature and time specified. Control bars were equilibrated at room temperature for 21 days. Elongation at break (in %) was measured according to D638-03, and the results are provided below.

TABLE 48

Elongation at Break for Annealed Injection Molded Bars

| | Annealing Conditions (temp., time) | Elongation at Break (%) |
|---|---|---|
| Bars, Lot 1 | Room Temp., 21 days | 12 |
| Bars, Lot 1 | 24 hours, 50° C. | 12.6 |
| Bars, Lot 1 | 24 hours, 60° C. | 15.3 |
| Bars, Lot 2 | Room Temp., 21 days | 12 |
| Bars, Lot 2 | 24 hours, 70° C. | 19 |

When exposed to temperatures of 50° C., there was no appreciable increase in elongation at break relative to the control (equilibration at room temperature). However, exposure to increasing temperatures of 60° C. and above improved elongation at break properties over the control.

Additional formulations were made, annealed, and tested.

TABLE 49

Annealed Injection Molding Polyhydroxyalkanoate Compositions, and Test Results

| | Formulation 2 | | | Formulation 3 | |
|---|---|---|---|---|---|
| PHA Blend 2 (wt %) | 97.09 | | | 82.88 | |
| Nucleating Masterbatch (wt %) | 2.91 | | | 2.49 | |
| Talc (wt %) | 0.00 | | | 14.63 | |

| Annealing Treatment | Control | 15 min @ 120 C. | 30 min @ 120 C. | Control | 30 min @ 120 C. |
|---|---|---|---|---|---|
| Tensile modulus (Mpa) | 1776 | 1227 | 1207 | 2919 | 2583 |
| Tensile stress at yield (Mpa) | 32 | 27 | 27 | 30 | 28 |
| Tensile strain at yield (%) | 10 | 19 | 19 | 5 | 9 |
| Tensile stress at break (Mpa) | 26 | 20 | 20 | 30 | 21 |
| Tensile strain at break (%) | 18 | 94 | 85 | 5 | 25 |
| Notched Izod (ft-lb/in) | 0.5 | 1.0 | 1.1 | 0.5 | 0.8 |

The PHA Blend 2 and the nucleating masterbatch were the same as for the previous formulation, and the two formulations were compounded and annealed similarly. The control bars were equilibrated as above. The bars were then tested. Tensile modulus (in Mpa), tensile stress at yield (in MPa), tensile strain at yield (in %), tensile stress at break (in MPa), and tensile strain at break (in %) were all tested according to ASTM D638-03. Notched Izod (in ft-lb/in) was tested according to D256-06.

The data show that, for the formulation made without talc, annealing of injection-molded parts for 15 minutes at 120° C. nearly doubles the notched izod values, and the tensile strain at break increased four-fold. However, tensile modulus and tensile stress and break were reduced. The improvements were similar, but less pronounced, in the formulation made with talc.

A slightly different formulation was made (Formulation 4). It contained 72.85% by weight PHA Blend 2, 4.57% by weight of a nucleating slurry, 11.66% by weight talc (FlexTalc 610D), 10.20% by weight calcium carbonate, and 0.74% by weight Acrawax C (50% concentrate). The PHA Blend 2 was the same as for the previous formulations. The nucleating slurry contained 33% by weight cyanuric acid in Citroflex A4 plasticizer.

The control bars were equilibrated as above. The bars were then tested. Elongation at break (in %) and tensile stress at yield (in MPa) were measured according to D638-03. Notched Izod (in ft-lb/in) was tested according to D256-06. Flexural modulus (in MPa) was measured according to D790-03. The annealing conditions and the test results are provided in the table below

TABLE 50

Annealed Injection Molding Polyhydroxyalkanoate Compositions, and Test Results

| | 48 hrs @ 50 C. | 4 hrs @ 90 C. | 1 hr @ 100 C. | 15 min @ 120 C. | 10 min @ 130 C. |
|---|---|---|---|---|---|
| Elongation at break (%) | 5 | 8 | 8 | 10 | 11 |
| Tensile stress at yield (Mpa) | 28 | 27 | 27 | 26 | 25 |
| Notched Izod (ft-lb/in) | 0.5 | 0.8 | 0.8 | 0.9 | 0.9 |
| Flexural modulus (MPa) | 2,729 | 2,505 | 2,324 | 2,247 | 2,190 |

As for the previous formulations, the impact properties improved upon annealing, while strength and modulus decreased. Annealing at higher temperatures was found to shorten the annealing time required.

Another formulation was also made (Formulation 4), which had the same ingredients and make-up as Formulation 3, but used a different batch of PHA Blend.

Bars made from Formulations 2 and above, and Formulation 4, were annealed with steam in a kitchen pressure cooker, and tested for their strength and impact properties, as above. Another formulation was also made (Formulation 4), which had the same ingredients and make-up as Formulation 3, but a different batch of PHA Blend 2. The results are shown in the table below.

TABLE 51

Steam-Annealed Injection Molding Polyhydroxyalkanoate Compositions, and Test Results

| | 2 | 2 | 2 | 2 | 3 | 3 | 3 | 4 | 4 | 4 |
|---|---|---|---|---|---|---|---|---|---|---|
| Annealing Treatment | Control | | | | Control | | | Control | | |
| Time (min) | — | 15 | 30 | 30 | — | 30 | 30 | — | 30 | 30 |
| Temp (C) | — | 120 | 120 | 120 | — | 120 | 120 | — | 120 | 120 |
| Steam Y/N | | N | N | Y | | N | Y | | N | Y |
| Tensile modulus (Mpa) | 1776 | 1227 | 1207 | 957 | 2919 | 2583 | 1985 | 1792 | 1427 | 1182 |
| Tensile stress at yield (Mpa) | 32 | 27 | 27 | 26 | 30 | 28 | 26 | 30 | 27 | 26 |
| Tensile strain at yield (%) | 10 | 19 | 19 | 25 | 5 | 9 | 11 | 10 | 14 | 16 |
| Tensile stress at break (Mpa) | 26 | 20 | 20 | 20 | 30 | 21 | 21 | 28 | 22 | 22 |
| Tensile strain at break (%) | 18 | 94 | 85 | 90 | 5 | 25 | 21 | 13 | 40 | 31 |
| Notched Izod (ft-lb/in) | 0.5 | 1.0 | 1.1 | 1.8 | 0.5 | 0.8 | 0.9 | 0.6 | 0.9 | 1.1 |

The improvements seen with steam annealing were similar to those achieved without steam.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein is used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of branching a starting polyhydroxyalkanoate polymer (PHA), comprising reacting the starting PHA with a branching agent in the presence of at least two cross-linking agents, thereby forming a branched PHA, wherein the branching agent is peroxide, azo-nitrile, perester or peroxycarbonate, and wherein the cross-linking agents are
   an epoxy functional compound containing two or more epoxide groups and
   a compound comprising at least two double bonds.

2. The method claim 1, wherein the branching agent is selected from: dicumyl peroxide, t-amyl-2-ethylhexyl peroxycarbonate, 1,1-bis(t-butylperoxy)-3,3,5-trimethylcyclohexane, 2,5-dimethyl-2,5-di(t-butylperoxy) hexane, 2,5-bis(t-butylperoxy)-2,5-dimethylhexane, 2,5-dimethyl-di(t-butylperoxy)hexyne-3, di-t-butyl peroxide, benzoyl peroxide, di-t-amyl peroxide, t-butyl cumyl peroxide, n-butyl-4,4-bis(t-butylperoxy)valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy) butyrate, t-butylperoxy-acetate, t-amylperoxyacetate, t-butylperoxybenzoate, t-amylperoxybenzoate, and di-t-butyl-diperoxyphthalate.

3. The method of claim 1, wherein the concentration of branching agent is between 0.001 to 0.5% by weight of the PHA.

4. The method of claim 1, wherein the melt strength (elasticity) (G') of the branched PHA is greater than the melt strength of the starting PHA.

5. The method of claim 4, wherein the melt strength of the branched PHA is at least twice to about 20 times that of the starting PHA as measured at 0.25 rad/sec at 160° C.

6. A method of branching a starting polyhydroxyalkanoate polymer PHA comprising reacting the starting PHA with a branching agent and a cross-linking agent, thereby forming a branched PHA, provided that the branching agent is optionally omitted when the cross-linking agent is an epoxy functional compound, wherein the starting PHA is thermolysed to reduce its molecular weight between 25-75% before reacting with the branching agent, wherein the starting PHA is thermolysed in the presence of the cross-linking agent.

7. The method of claim 1, wherein one cross-linking agent is an epoxy-functional styrene-acrylic polymer, an epoxy-functional acrylic copolymer, an epoxy-functional polyolefin copolymer, an oligomer comprising a glycidyl group with an epoxy functional side chain, an epoxy-functional poly(ethylene-glycidyl methacrylate-co-methacrylate), an epoxidized oil, diallyl phthalate, pentaerythritol tetraacrylate, trimethylolpropane triacrylate, pentaerythritol triacrylate, dipentaerythritol pentaacrylate, diethylene glycol dimethacrylate, or bis(2-methacryloxyethyl)phosphate.

8. The method of claim 1, wherein, the polyhydroxyalkanoate polymer is a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate);
   a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content;
   a polymer blend of a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate);
   a polymer blend of a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content;
   a polymer blend of a) a poly(3-hydroxybutyrate) homopolymer blended with b) a poly(3-hydroxybutyrate-co-4-hydroxybutyrate) and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) is 5% to 95% of the combined weight of polymer a) and polymer b); a) a poly(3-hydroxybutyrate) homopolymer blended to with b) a poly(3-hydroxybutyrate-co-3-hydroxyhexanoate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) is 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) is 5% to 95% of the combined weight of polymer a) and polymer b); wherein the weight of polymer a) is 20% to 60% of the combined weight of polymer a) and polymer b) and the weight of polymer b) is 40% to 80% of the combined weight of polymer a) and polymer b);

a polymer blend of a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content; a polymer blend of a) a poly(3-hydroxybutyrate) homopolymer blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); wherein the weight of polymer a) is 20% to 60% of the combined weight of polymer a) and polymer b) and the weight of polymer b is 40% to 80% of the combined weight of polymer a) and polymer b).

9. A method of branching a starting polyhydroxyalkanoate polymer PHA comprising reacting the starting PHA with a branching agent and a cross-linking agent, thereby forming a branched PHA, provided that the branching agent is optionally omitted when the cross-linking agent is an epoxy functional compound wherein, the starting polyhydroxyalkanoate polymer is a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate);

a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content;

a polymer blend of a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate);

a polymer blend of a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content;

a polymer blend of a) a poly(3-hydroxybutyrate) homopolymer blended with b) a poly(3-hydroxybutyrate-co-4-hydroxybutyrate) and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) is 5% to 95% of the combined weight of polymer a) and polymer b); a) a poly(3-hydroxybutyrate) homopolymer blended to with b) a poly(3-hydroxybutyrate-co-3-hydroxyhexanoate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) is 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) is 5% to 95% of the combined weight of polymer a) and polymer b); wherein the weight of polymer a) is 20% to 60% of the combined weight of polymer a) and polymer b) and the weight of polymer b) is 40% to 80% of the combined weight of polymer a) and polymer b);

a polymer blend of a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content;

a polymer blend of a) a poly(3-hydroxybutyrate) homopolymer blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); wherein the weight of polymer a) is 20% to 60% of the combined weight of polymer a) and polymer b) and the weight of polymer b is 40% to 80% of the combined weight of polymer a) and polymer b), and the starting polyhydroxyalkanoate is further blended with polymer c) a poly(3-hydroxybutyrate-co-4-hydroxybutyrate) with a 20% to 50% 4-hydroxybutyrate content; a poly(3-hydroxybutyrate-co-5-hydroxyvalerate) with a 20% to 50% 5-hydroxyvalerate content or a poly(3-hydroxybutyrate-co-3-hydroxyhexanoate) with a 5% to 50% 3-hydroxyhexanoate content and wherein the weight of polymer c) is 5% to 95% of the combined polymer weight of polymer a), polymer b) and polymer c) or the weight of polymer c is 5% to 40% of the combined polymer weight of polymer a), polymer b) and polymer c).

10. A branched polyhydroxyalkanoate polymer made by the method of claim 1, comprising a plurality of PHA chains connected through a cross linking agent.

11. The branched polymer of claim 10, comprising a plurality of PHAs, connected at an end to another PHA through a functional cross-linking agent.

12. The branched polyhydroxyalkanoate polymer of claim 10, wherein the polyhydroxyalkanoate polymer is a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate; a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content;

a polymer blend of a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate);

a polymer blend of a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content;

a polymer blend of a) a poly(3-hydroxybutyrate) homopolymer blended with b) a poly(3-hydroxybutyrate-co-4-hydroxybutyrate) and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) is 5% to 95% of the combined weight of polymer a) and polymer b); a) a poly(3-hydroxybutyrate) homopolymer blended to with b) a poly(3-hydroxybutyrate-co-3-hydroxyhexanoate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) is 5% to 95% of the combined weight of polymer a) and polymer b); or a) a poly(3-hydroxybutyrate-co- 3-hydroxyvalerate) blended with b) a poly(3-hydroxybutyrate-co-3-hydroxyhexanoate) and the weight of polymer a) is 5% to 95% of the combined weight of polymer a) and polymer b); wherein the weight of polymer a) is 20% to 60% of the combined weight of polymer a) and polymer b) and the weight of polymer b) is 40% to 80% of the combined weight of polymer a) and polymer b);

a polymer blend of a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content;

a polymer blend of a) a poly(3-hydroxybutyrate) homopolymer blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); wherein the weight of polymer a) is 20% to 60% of the combined weight of polymer a) and polymer b) and the weight of polymer b is 40% to 80% of the combined weight of polymer a) and polymer b).

13. A branched polyhydroxyalkanoate polymer made by a method of branching a starting polyhydroxyalkanoate polymer (PHA), the method comprising reacting the starting PHA with a branching agent and a cross-linking agent, thereby forming a branched PHA, provided that the branching agent is optionally omitted when the cross-linking agent is an epoxy functional compound; wherein the branched polyhydroxyalkanoate polymer comprises a plurality of PHA chains connected through a cross linking agent; and the polyhydroxyalkanoate polymer is a poly(3-hydroxybutyrate) homopolymer, a poly(3-hydroxybutyrate-co-4-hydroxybutyrate), a poly(3- hydroxybutyrate-co-3-hydroxyvalerate), a poly(3-hydroxybutyrate-co-5-hydroxyvalerate), or a poly(3-hydroxybutyrate-co-3-hydroxyhexanoate; a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content;

a polymer blend of a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate);

a polymer blend of a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content;

a polymer blend of a) a poly(3-hydroxybutyrate) homopolymer blended with b) a poly(3-hydroxybutyrate-co-4-hydroxybutyrate) and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) is 5% to 95% of the combined weight of polymer a) and polymer b); a) a poly(3-hydroxybutyrate) homopolymer blended to with b) a poly(3-hydroxybutyrate-co-3-hydroxyhexanoate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) is 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) is 5% to 95% of the combined weight of polymer a) and polymer b); wherein the weight of polymer a) is 20% to 60% of the combined weight of polymer a) and polymer b) and the weight of polymer b) is 40% to 80% of the combined weight of polymer a) and polymer b);

a polymer blend of a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content;

a polymer blend of a) a poly(3-hydroxybutyrate) homopolymer blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); wherein the weight of polymer a) is 20% to 60% of the combined weight of polymer a) and polymer b) and the weight of polymer b is 40% to 80% of the combined weight of polymer a) and polymer b); and wherein the starting polyhydroxyalkanoate is further blended with polymer c) a poly(3-hydroxybutyrate-co-4-hydroxybutyrate) with a 20% to 50% 4-hydroxybutyrate content; a poly(3-hydroxybutyrate-co-5-hydroxyvalerate) with a 20% to 50% 5-hydroxyvalerate content or a poly(3-hydroxybutyrate-co-3-hydroxyhexanoate) with a 5% to 50% 3-hydroxyhexanoate content and wherein the weight of polymer c) is 5% to 95% of the combined polymer weight of polymer a), polymer b) and polymer c) or the weight of polymer c is 5% to 40% of the combined polymer weight of polymer a), polymer b) and polymer c).

14. A blown film, comprising the branched PHA polymer of claim 10.

15. A thermoformed article made by
a) reacting a starting PHA with a branching agent in the presence of a cross-linking agent at a temperature above the decomposition temperature of the branching agent, thereby forming a branched PHA,
b) extruding the branched PHA,
c) thermoforming the branched PHA, thereby forming a thermoformed article, wherein the starting PHA comprises a copolymer blend comprising a poly (3-hydroxybutyrate-co-4-hydroxybutyrate) polymer and the cross-linking agent is diethylene glycol dimethacrylate.

16. A method of branching a starting polyhydroxyalkanoate polymer (PHA), comprising reacting the starting PHA with a branching agent and a cross-linking agent, thereby forming a branched PHA, provided that the branching agent is optionally omitted when the cross-linking agent is an epoxy functional compound, wherein the starting PHA comprises a copolymer blend comprising a poly(3-hydroxybutyrate-co-4-hydroxybutyrate) polymer and the cross-linking agent is diethylene glycol dimethacrylate.

17. The method of claim 1, wherein the epoxy-functional compound is
an epoxy-functional, styrene-acrylic polymer, an acrylic and/or polyolefin copolymer or oligomer containing glycidyl groups incorporated as side chains, or an epoxidized oil.

18. The method of claim 1, wherein the cross-linking agent with two or more double bonds is diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate.

* * * * *